(12) United States Patent
Yoshitsugu

(10) Patent No.: US 7,697,215 B2
(45) Date of Patent: *Apr. 13, 2010

(54) ZOOM LENS SYSTEM, IMAGING DEVICE AND CAMERA

(75) Inventor: Keiki Yoshitsugu, Osaka (JP)

(73) Assignee: Panasonic Corporation, Osaka (JP)

( * ) Notice: Subject to any disclaimer, the term of this patent is extended or adjusted under 35 U.S.C. 154(b) by 134 days.

This patent is subject to a terminal disclaimer.

(21) Appl. No.: 12/073,192

(22) Filed: Mar. 3, 2008

(65) Prior Publication Data

US 2008/0158691 A1    Jul. 3, 2008

Related U.S. Application Data

(62) Division of application No. 11/631,003, filed as application No. PCT/JP2005/011761 on Jun. 27, 2005, now Pat. No. 7,369,323.

(30) Foreign Application Priority Data

Jun. 29, 2004    (JP) ............................. 2004-191992

(51) Int. Cl.
   *G02B 15/14*    (2006.01)
(52) U.S. Cl. ........................................ 359/682; 359/689
(58) Field of Classification Search ......... 359/680–682, 359/689
   See application file for complete search history.

(56) References Cited

U.S. PATENT DOCUMENTS

| 6,308,011 | B1 * | 10/2001 | Wachi et al. .................... 396/72 |
| 6,498,687 | B1 | 12/2002 | Sekita et al. |
| 6,538,824 | B1 | 3/2003 | Mihara et al. |
| 6,545,819 | B1 | 4/2003 | Nanba et al. |
| 6,671,103 | B2 | 12/2003 | Itoh |
| 7,092,170 | B2 | 8/2006 | Satori |
| 7,215,483 | B2 | 5/2007 | Sekita |
| 7,283,314 | B2 | 10/2007 | Nanba |
| 7,369,323 | B2 * | 5/2008 | Yoshitsugu .................. 359/682 |
| 2002/0149857 | A1 | 10/2002 | Nobe |
| 2003/0099042 | A1 | 5/2003 | Nanba |
| 2003/0133201 | A1 | 7/2003 | Nanba et al. |

(Continued)

FOREIGN PATENT DOCUMENTS

JP    2001-272602 A    10/2001

(Continued)

*Primary Examiner*—Scott J Sugarman
(74) *Attorney, Agent, or Firm*—McDermott Will & Emery LLP

(57) ABSTRACT

The zoom lens system is used for forming an optical image of an object with a variable magnification, and, in order from the object side, comprises a first lens unit G1 of negative optical power, a second lens unit G2 of positive optical power and a third lens unit G3 of positive optical power. The lens units move respectively along the optical axis so that a magnification is changed with changing a distance between the respective lens units. The second lens unit G2 comprises at least three lens elements including an object side lens element of the second lens unit which is a positive lens element arranged on the most object side with the surface of strong curvature facing the object side, and an image side lens element of the second lens unit which is a positive lens element arranged on the most image side with the convex surface facing the object side.

9 Claims, 57 Drawing Sheets

U.S. PATENT DOCUMENTS

| | | |
|---|---|---|
| 2003/1013320 | 7/2003 | Nanba et al. |
| 2003/1013824 | 7/2003 | Watanabe |
| 2003/0165018 A1 | 9/2003 | Mihara |
| 2003/0197951 A1 | 10/2003 | Nanba et al. |
| 2003/0210471 A1 | 11/2003 | Mihara et al. |
| 2004/1007641 | 4/2004 | Mihara |
| 2004/0136089 A1 | 7/2004 | Takahashi et al. |
| 2004/0179245 A1 | 9/2004 | Mihara |
| 2004/0223231 A1 | 11/2004 | Sekita |
| 2005/0024749 A1 | 2/2005 | Nanba et al. |
| 2005/0030642 A1 | 2/2005 | Nanba et al. |
| 2005/0041303 A1 | 2/2005 | Nanba et al. |
| 2005/0063070 A1 | 3/2005 | Watanabe et al. |
| 2005/0068634 A1 | 3/2005 | Miyatake et al. |
| 2006/0072212 A1 | 4/2006 | Nanba et al. |
| 2006/0238889 A1 | 10/2006 | Nanba et al. |
| 2006/0238890 A1 | 10/2006 | Nanba et al. |

FOREIGN PATENT DOCUMENTS

| | | |
|---|---|---|
| JP | 2001-281545 A | 10/2001 |
| JP | 2001-296475 A | 10/2001 |
| JP | 2001-296476 A | 10/2001 |
| JP | 2002-48975 A | 2/2002 |
| JP | 2002-196240 A | 7/2002 |
| JP | 2002-244043 A | 8/2002 |
| JP | 2003-57547 A | 2/2003 |
| JP | 2003-114386 A | 4/2003 |
| JP | 2003-121740 A | 4/2003 |
| JP | 2003-121741 A | 4/2003 |
| JP | 2003-121743 A | 4/2003 |
| JP | 2003-131132 A | 5/2003 |
| JP | 2003-140043 A | 5/2003 |
| JP | 2003-140047 A | 5/2003 |
| JP | 2003-149553 A | 5/2003 |
| JP | 2003-149556 A | 5/2003 |
| JP | 2003-177316 A | 6/2003 |
| JP | 2004-102211 A | 4/2004 |
| JP | 2004-170664 A | 6/2004 |
| JP | 2004-246141 A | 9/2004 |
| JP | 2004-318105 A | 11/2004 |
| JP | 2004-333767 A | 11/2004 |
| JP | 2005-99091 A | 4/2005 |
| JP | 2005-164653 A | 6/2005 |
| JP | 2005-234460 A | 9/2005 |
| WO | WO 031085440 A1 | 10/2003 |

* cited by examiner

SPHERICAL ABERRATION (mm)

SPHERICAL ABERRATION (mm)

W 11.62

-2.0  .0  2.0

DISTORTION (%)

SPHERICAL ABERRATION (mm)

SPHERICAL ABERRATION (mm)

DISTORTION (%)

C-LINE
d-LINE
F-LINE

C-LINE
d-LINE
F-LINE

F-LINE
C-LINE
d-LINE

C-LINE
F-LINE
d-LINE

C-LINE
d-LINE
F-LINE

ZOOM LENS SYSTEM, IMAGING DEVICE AND CAMERA

RELATED APPLICATIONS

This application is a Divisional of U.S. application Ser. No. 11/631,003, filed Dec. 28, 2006, now U.S. Pat. No. 7,369,323 which is a U.S. National Phase under 35 U.S.C. § 371 of International Application No. PCT/JP2005/011761, filed Jun. 27, 2005, claiming priority of Japanese Application No. 2004-191992, filed Jun. 29, 2004, the entire contents of each of which are hereby incorporated by reference.

TECHNICAL FIELD

The present invention relates to a zoom lens system, an imaging device and a camera, and in particular to: a zoom lens system of high image quality and small size which is stable to a digital still camera, a digital video camera and the like; an imaging device including the zoom lens system; and a camera including the imaging device.

BACKGROUND ART

In a digital still camera using a solid-state image sensor such as a CCD (Charge Coupled Device) or a CMOS (Complementary Metal-Oxide Semiconductor), a lens system having a comparatively long back focus is necessary in order that a member such as an optical low-pass filter should be arranged between the rearmost part of the lens element and the solid-state image sensor. Further, in the shooting optical system of the digital still camera, a satisfactory telecentric property is required in order to avoid shading that could cause a reduction in the amount of light in the periphery on the image surface.

A large number of types of digital still cameras can be considered. One of these types is a compact type. As zoom lens systems suitable for digital still cameras of compact type, in the prior art, three-unit zoom lens systems have been proposed that, in order from the object side, comprise a first lens unit having negative optical power, a second lens unit having positive optical power and a third lens unit having positive optical power. The inventors of the present application have proposed a three-unit zoom lens system appropriate for a digital still camera of compact type (Patent Document 1).

[Patent document 1] International Publication No. 03/085440 Pamphlet

DISCLOSURE OF THE INVENTION

Problems to be Solved by the Invention

Nevertheless, although the zoom lens system disclosed in Patent Document 1 is satisfactory in the optical performance, there still has a possibility of being improved concerning the entire length during shooting and non-shooting (also referred to as retraction). If the entire length of the zoom lens system disclosed in Patent Document 1 were shortened directly, aberration balance in the entire system would be degraded. Thus, the optical performance would not be maintained.

An object of the present invention is to provide: a zoom lens system having a short entire length during shooting and non-shooting and a high resolution; and an imaging device using the zoom lens system. Further, an object of the present invention is to provide a camera including the imaging device.

Solution of the Problems

One of the above objects is achieved by the following zoom lens system. A zoom lens system that forms an optical image of an object with a variable magnification, in order from the object side, comprises a first lens unit of negative optical power, a second lens unit of positive optical power and a third lens unit of positive optical power, wherein the lens units move respectively along an optical axis so that a magnification is changed with changing a distance between the respective lens units, the first lens unit, in order from the object side, comprises a first lens element having a negative meniscus shape with the surface of strong curvature facing the image side and a second lens element which is a positive lens element with the surface of strong curvature facing the object side, the second lens unit comprises at least three lens elements including an object side lens element of the second lens unit which is a positive lens element arranged on the most object side with the surface of strong curvature facing the object side and an image side lens element of the second lens unit which is a positive lens element arranged on the most image side with the convex surface facing the object side, the third lens unit comprises solely one positive lens element, in magnification change from a wide-angle limit to a telephoto limit, the first lens unit moves with locus of a convex to the image side, while the second lens unit monotonically moves to the object side, and the following condition is satisfied;

$$|L_W - L_T|/L_W < 0.1 \quad (1)$$

(here, $Z = f_T/f_W > 2.5$)

where, $L_W$ is an entire optical length at a wide-angle limit, $L_T$ is an entire optical length at a telephoto limit, $f_T$ is a focal length of the entire lens system at a telephoto limit, and $f_W$ is a focal length of the entire lens system at a wide-angle limit.

Preferably, the second lens unit, in order from the object side, comprises a third lens element which is a positive lens element with the surface of strong curvature facing the object side, a fourth lens element which is a positive lens element, a fifth lens element which is a negative lens element, and a sixth lens element which is a positive lens element with the convex surface facing the object side.

Preferably, the second lens unit, in order from the object side, comprises a third lens element which is a positive lens element with the surface of strong curvature facing the object side, a fourth lens element which is a negative lens element, and a fifth lens element which is a positive lens element with the convex surface facing the object side.

Preferably, the following condition is satisfied;

$$1.9 < f_{G2}/f_W < 2.4 \quad (2)$$

(here, $Z = f_T/f_W > 2.5$)

where, $f_{G2}$ is a focal length of the second lens unit, $f_T$ is a focal length of the entire lens system at a telephoto limit, and $f_W$ is a focal length of the entire lens system at a wide-angle limit.

Preferably, the following condition is satisfied;

$$3.2 < f_{G3}/f_W < 4.0 \qquad (3)$$

(here, $Z=f_T/f_W>2.5$)

where,
$f_{G3}$ is a focal length of the third lens unit,
$f_T$ is a focal length of the entire lens system at a telephoto limit, and
$f_W$ is a focal length of the entire lens system at a wide-angle limit.

Preferably, the following condition is satisfied;

$$0.4 < f_F/f_{G2} < 1.1 \qquad (4)$$

where,
$f_{G2}$ is a focal length of the second lens unit, and
$f_F$ is a focal length of the most object side lens element of the second lens unit.

Preferably, the following condition is satisfied;

$$0.9 < f_R/f_{G2} < 1.5 \qquad (5)$$

where,
$f_{G2}$ is a focal length of the second lens unit, and
$f_R$ is a focal length of the most image side lens element of the second lens unit.

Preferably, the following condition is satisfied;

$$3 < r_{1F}/f_W < 10 \qquad (6)$$

(here, $Z=f_T/f_W>2.5$)

where,
$r_{1F}$ is a radius of curvature of the object side surface of the first lens element,
$f_W$ is a focal length of the entire lens system at a wide-angle limit, and
$f_T$ is a focal length of the entire lens system at a telephoto limit.

Preferably, the following condition is satisfied;

$$2.0 < r_{2R}/f_W < 3.8 \qquad (7)$$

(here, $Z=f_T/f_W>2.5$)

where,
$r_{2R}$ is a radius of curvature of the image side surface of the second lens element,
$f_W$ is a focal length of the entire lens system at a wide-angle limit, and
$f_T$ is a focal length of the entire lens system at a telephoto limit.

Preferably, the following condition is satisfied;

$$0.20 < d_R/f_{G2} \times L_W/f_W < 0.29 \qquad (8)$$

(here, $Z=f_T/f_W>2.5$)

where,
$d_R$ is an axial distance between the most image side lens element of the second lens unit and the lens surface adjacent thereto on the object side,
$f_{G2}$ is a focal length of the second lens unit,
$L_W$ is an entire optical length at a wide-angle limit, and
$f_W$ is a focal length of the entire lens system at a wide-angle limit.

Preferably, the following condition is satisfied;

$$1.0 < r_{RF}/f_{G2} < 4.0 \qquad (9)$$

where,
$f_{G2}$ is a focal length of the second lens unit, and
$r_{RF}$ is a radius of curvature of the object side surface of the most image side lens element of the second lens unit.

Preferably, the following condition is satisfied;

$$-1.8 < (|r_{RF}|-|r_{RR}|)/f_W < -0.2 \qquad (10)$$

(here, $Z=f_T/f_W>2.5$)

where,
$r_{RR}$ is a radius of curvature of the image side surface of the most image side lens element of the second lens unit,
$r_{RF}$ is a radius of curvature of the object side surface of the most image side lens element of the second lens unit,
$f_W$ is a focal length of the entire lens system at a wide-angle limit, and
$f_T$ is a focal length of the entire lens system at a telephoto limit.

Preferably, the following condition is satisfied;

$$2 < r_{RF}/f_W < 5 \qquad (11)$$

(here, $Z=f_T/f_W>2.5$)

where,
$r_{RF}$ is a radius of curvature of the object side surface of the most image side lens element of the second lens unit,
$f_W$ is a focal length of the entire lens system at a wide-angle limit, and
$f_T$ is a focal length of the entire lens system at a telephoto limit.

Preferably, the following condition is satisfied;

$$0.01 < (r_{RR}+r_{RF})/(r_{RR}-r_{RF}) < 0.3 \qquad (12)$$

where,
$r_{RR}$ is a radius of curvature of the image side surface of the most image side lens element of the second lens unit, and
$r_{RF}$ is a radius of curvature of the object side surface of the most image side lens element of the second lens unit.

Preferably, the following condition is satisfied;

$$1.2 < (r_{RF}+r_{NR})/(r_{RF}-r_{NR}) < 1.8 \qquad (13)$$

where,
$r_{NR}$ is a radius of curvature of the lens surface on the object side adjacent to the most image side lens element of the second lens unit, and
$r_{RF}$ is a radius of curvature of the object side surface of the most image side lens element of the second lens unit.

Preferably, the second lens unit moves in a direction perpendicular to the optical axis so that image blur generated by vibration of the zoom lens system can be compensated, and the following condition is satisfied;

$$1.7 < (1-m_{G2T})m_{G3T} < 2.1 \qquad (14)$$

where,
$m_{G2T}$ is a magnification of the second lens unit at a wide-angle limit in a case that the shooting distance is ∞, and
$m_{G3T}$ is a magnification of the third lens unit at a wide-angle limit in a case that the shooting distance is ∞.

One of the above objects is achieved by the following imaging device. An imaging device capable of converting an optical image of a photographic object into an electric image signal and then outputting the signal, comprises:

a zoom lens system that forms an optical image of the photographic object with a variable magnification; and an image sensor that converts the optical image of the photographic object formed by the zoom lens system into the electric signal, wherein the zoom lens system, in order from the object side, comprises a first lens unit of negative optical power, a second lens unit of positive optical power and a third lens unit of positive optical power, in which the lens units move respectively along an optical axis so that a magnification is changed with changing a distance between the respective lens units, the first lens unit, in order from the object side, comprises a first lens element having a negative meniscus shape with the surface of strong curvature facing the image side and a second lens element which is a positive lens element with the surface of strong curvature facing the object side, the second lens unit comprises at least three lens elements including an object side lens element of the second lens unit which is a positive lens element arranged on the most object side with the surface of strong curvature facing the object side and an image side lens element of the second lens unit which is a positive lens element arranged on the most image side with the convex surface facing the object side, the third lens unit comprises solely one positive lens element, in magnification change from a wide-angle limit to a telephoto limit, the first lens unit moves with locus of a convex to the image side, while the second lens unit monotonically moves to the object side, and the above condition (1) is satisfied.

One of the above objects is achieved by the following camera. A camera capable of shooting a photographic object and then outputting it as an electric image signal, comprises:

an imaging device including a zoom lens system that forms an optical image of the photographic object with a variable magnification and an image sensor that converts the optical image of the photographic object formed by the zoom lens system into the electric signal, wherein the zoom lens system, in order from the object side, comprises a first lens unit of negative optical power, a second lens unit of positive optical power and a third lens unit of positive optical power, in which the lens units move respectively along an optical axis so that a magnification is changed with changing a distance between the respective lens units, the first lens unit, in order from the object side, comprises a first lens element having a negative meniscus shape with the surface of strong curvature facing the image side and a second lens element which is a positive lens element with the surface of strong curvature facing the object side, the second lens unit comprises at least three lens elements including an object side lens element of the second lens unit which is a positive lens element arranged on the most object side with the surface of strong curvature facing the object side and an image side lens element of the second lens unit which is a positive lens element arranged on the most image side with the convex surface facing the object side, the third lens unit comprises solely one positive lens element, in magnification change from a wide-angle limit to a telephoto limit, the first lens unit moves with locus of a convex to the image side, while the second lens unit monotonically moves to the object side, and the above condition (1) is satisfied.

EFFECT OF THE INVENTION

The present invention can provide: a zoom lens system having a short entire length during shooting and non-shooting and a high resolution; and an imaging device using the zoom lens system. Further, the present invention can provide a camera including the imaging device.

BRIEF DESCRIPTION OF THE DRAWINGS

FIG. 2I is a longitudinal aberration diagram of a zoom lens system according to Example 1.

FIG. 4I is a longitudinal aberration diagram of a zoom lens system according to Example 2.

FIG. 8I is a longitudinal aberration diagram of a zoom lens system according to Example 4.

DESCRIPTION OF THE REFERENCE CHARACTERS

Figure 1A:
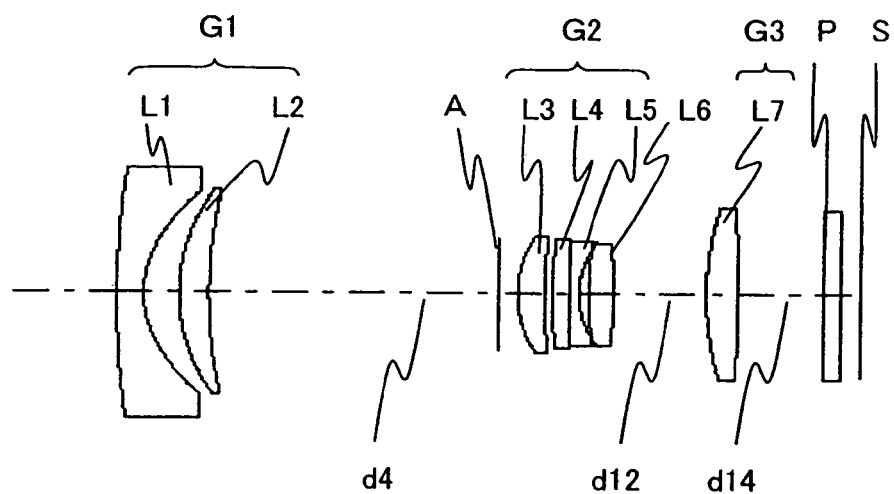
FIG. 1A is a construction diagram of a zoom lens system according to Embodiment 1 (Example 1).

G1 first lens unit
G2 second lens unit
G3 third lens unit
L1 first lens element
L2 second lens element
L3 third lens element
L4 fourth lens element
L5 fifth lens element
L6 sixth lens element
L7 seventh lens element
A diaphragm P plane parallel plate
S image surface
1 zoom lens system
2 solid-state image sensor
3 liquid crystal display monitor
4 body
5 main barrel
6 moving barrel
7 cylindrical cam

BEST MODE FOR CARRYING OUT THE INVENTION

Embodiments 1 to 5

Figure 1B:
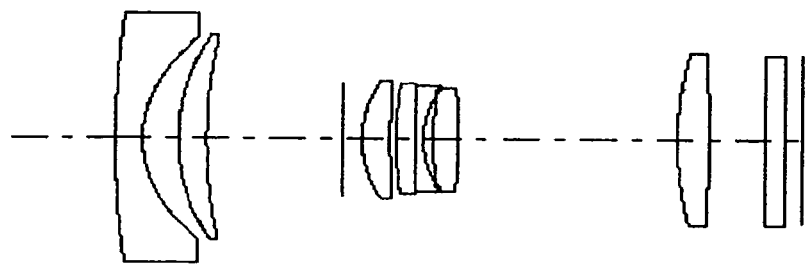
FIG. 1B is a construction diagram of a zoom lens system according to Embodiment 1 (Example 1).
Figure 1C:
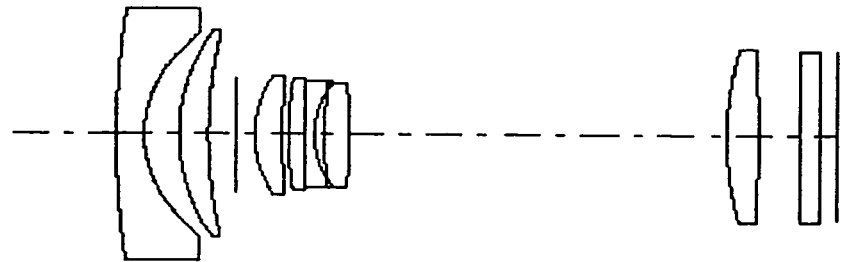
FIG. 1C is a construction diagram of a zoom lens system according to Embodiment 1 (Example 1).
Figure 2A:
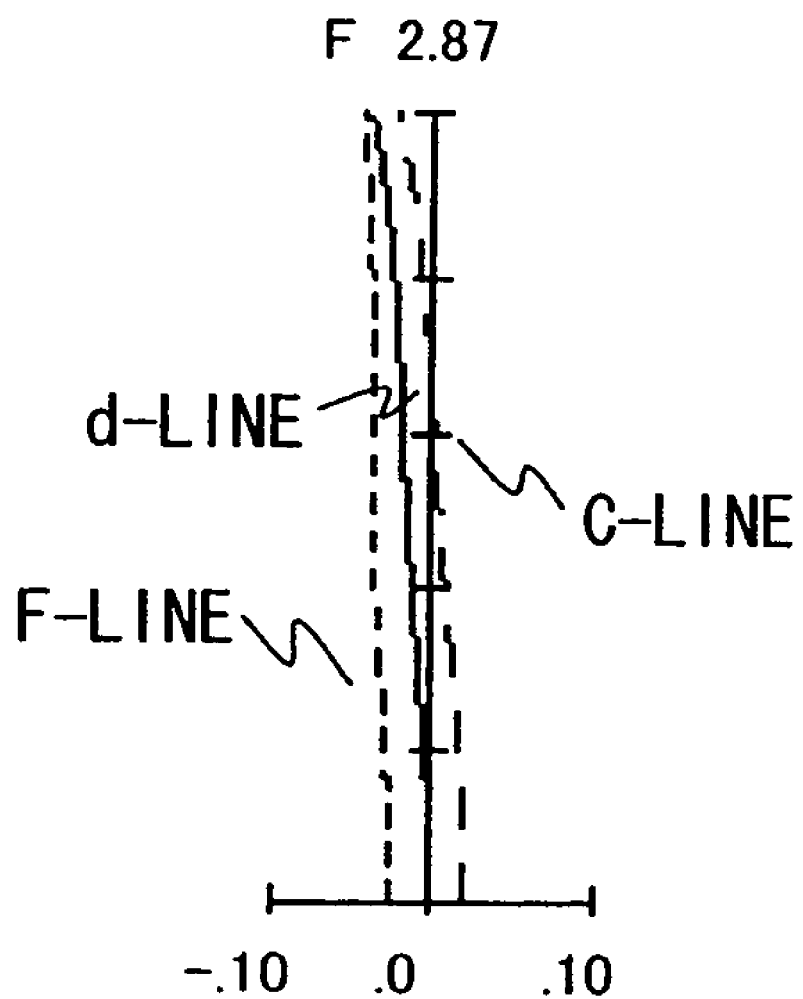
FIG. 2A is a longitudinal aberration diagram of a zoom lens system according to Example 1.
Figure 2B:
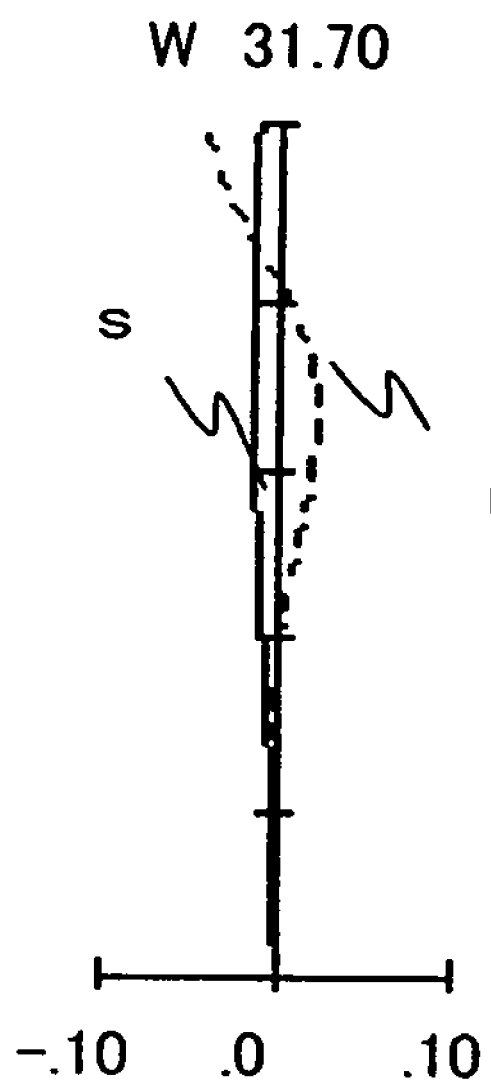
FIG. 2B is a longitudinal aberration diagram of a zoom lens system according to Example 1.
Figure 2C:
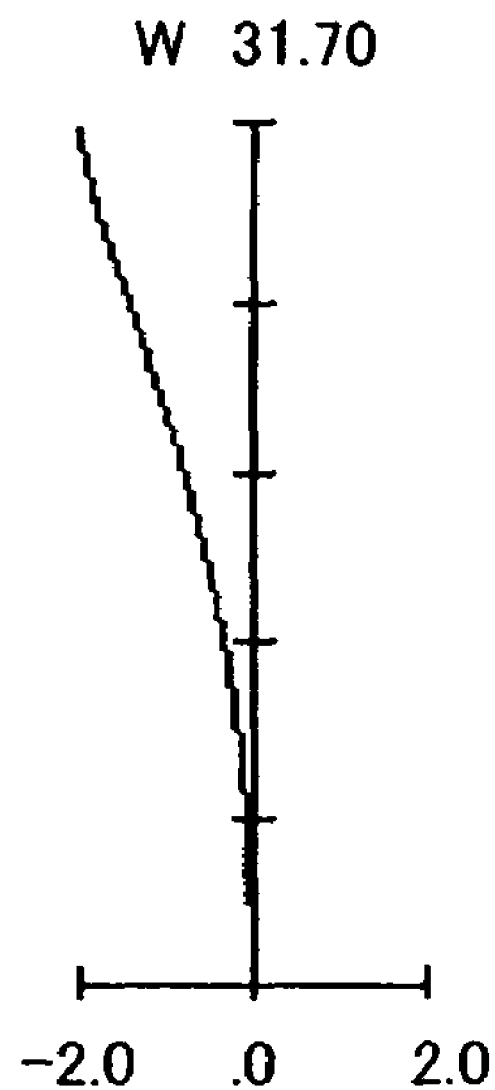
FIG. 2C is a longitudinal aberration diagram of a zoom lens system according to Example 1.
Figure 2D:
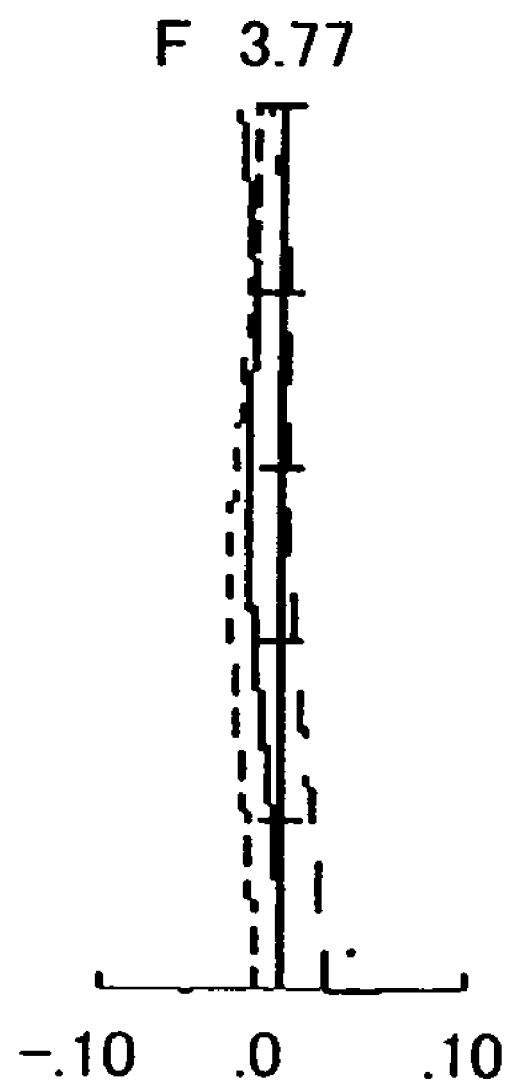
FIG. 2D is a longitudinal aberration diagram of a zoom lens system according to Example 1.
Figure 2E:
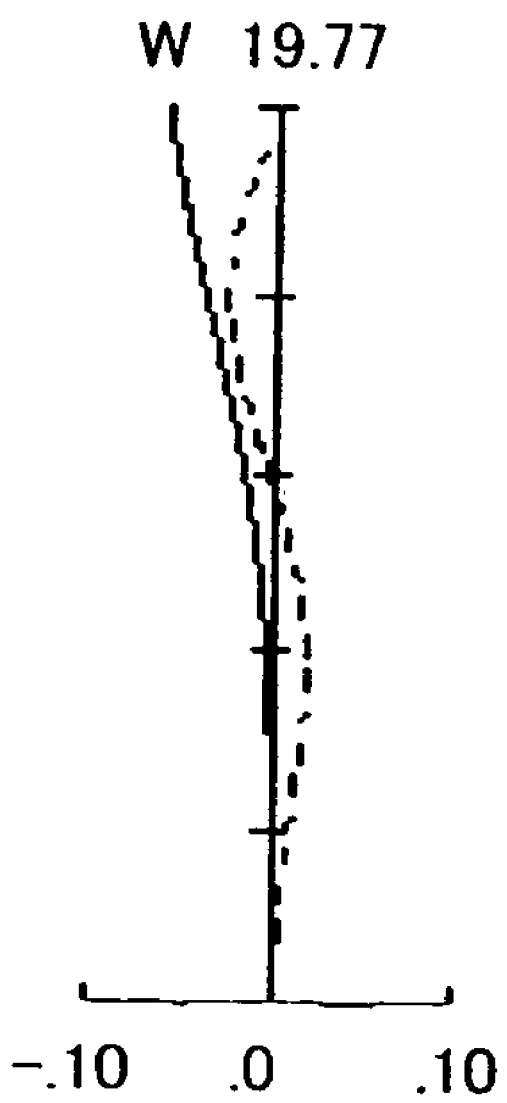
FIG. 2E is a longitudinal aberration diagram of a zoom lens system according to Example 1.
Figure 2F:
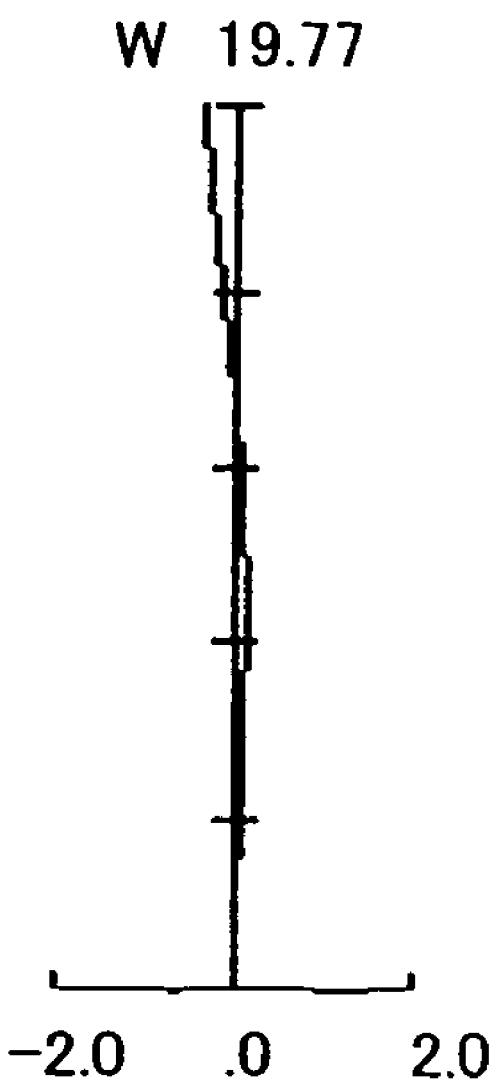
FIG. 2F is a longitudinal aberration diagram of a zoom lens system according to Example 1.
Figure 2G:
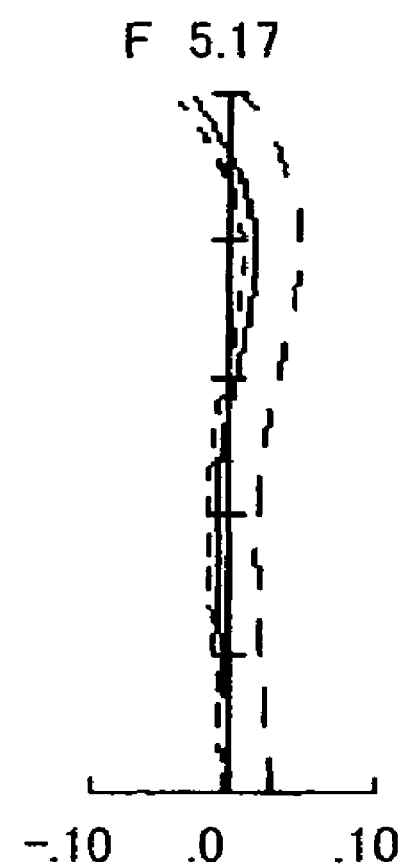
FIG. 2G is a longitudinal aberration diagram of a zoom lens system according to Example 1.
Figure 2H:
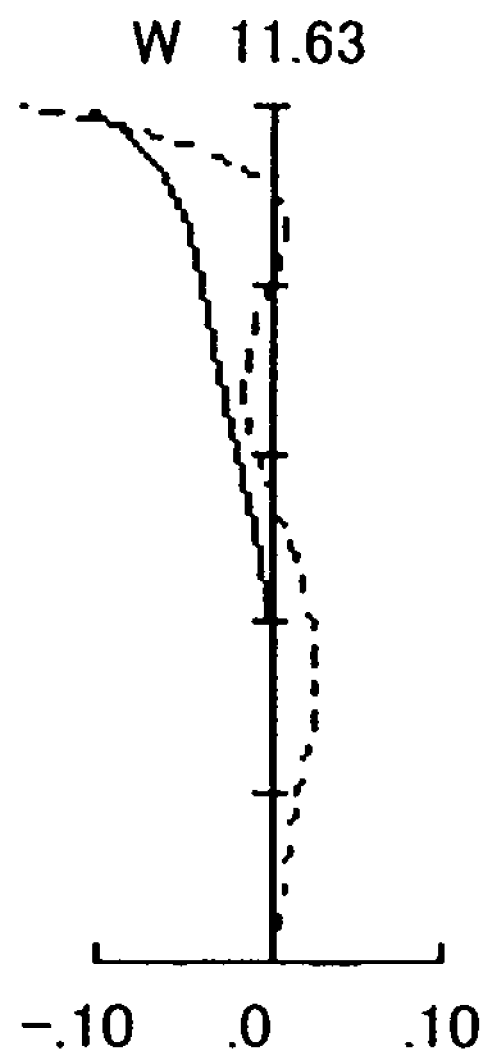
FIG. 2H is a longitudinal aberration diagram of a zoom lens system according to Example 1.
Figure 21:
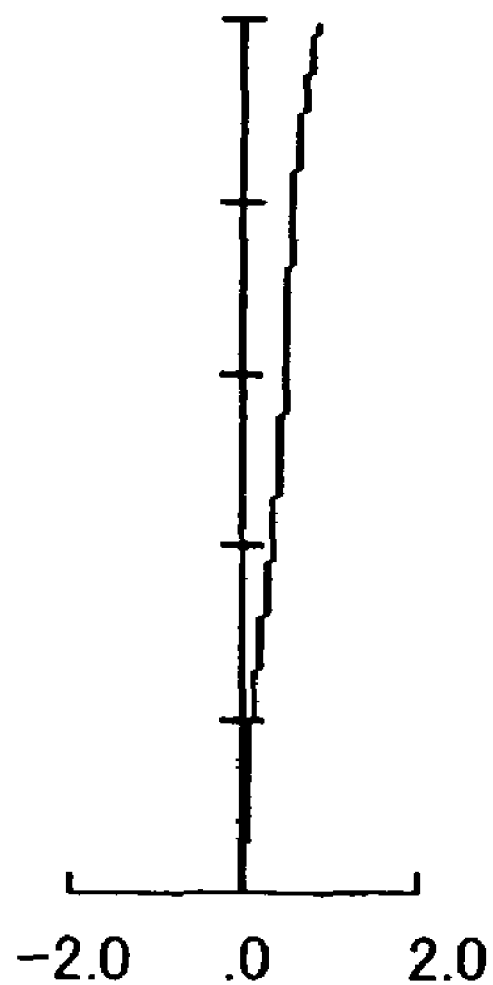
Figure 3A:
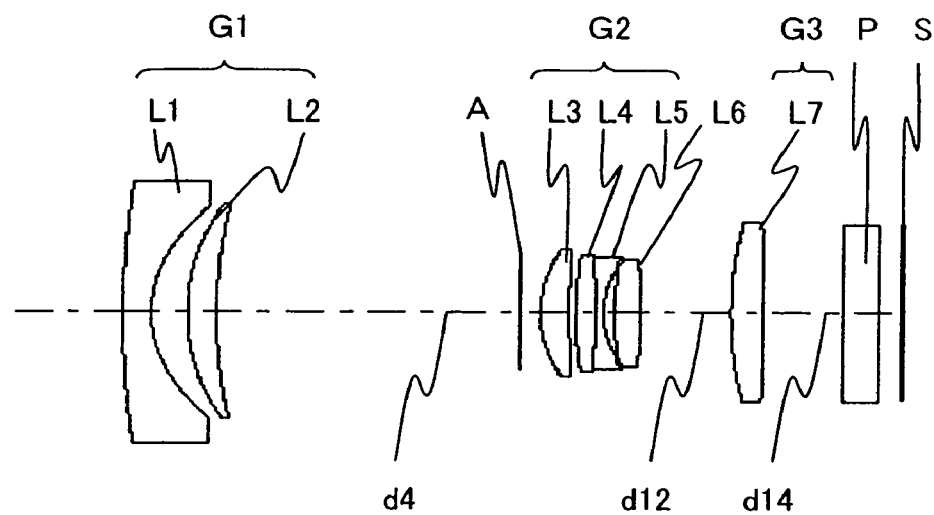
FIG. 3A is a construction diagram of a zoom lens system according to Embodiment 2 (Example 2).
Figure 3B:
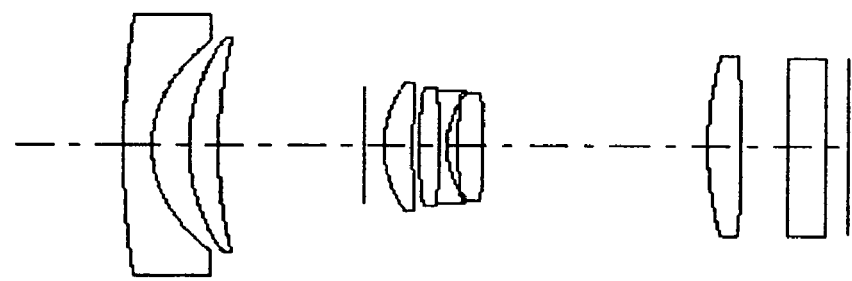
FIG. 3B is a construction diagram of a zoom lens system according to Embodiment 2 (Example 2).
Figure 3C:
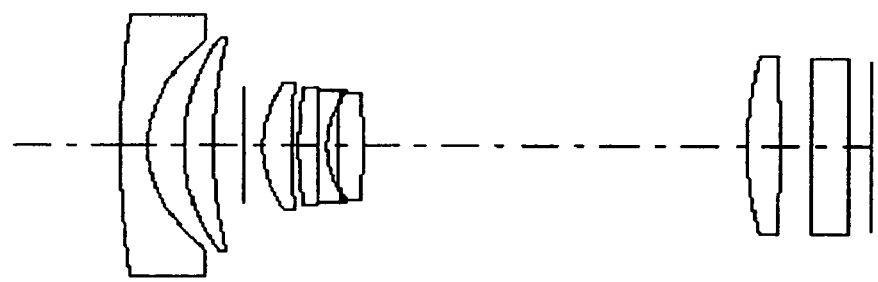
FIG. 3C is a construction diagram of a zoom lens system according to Embodiment 2 (Example 2).
Figure 4A:
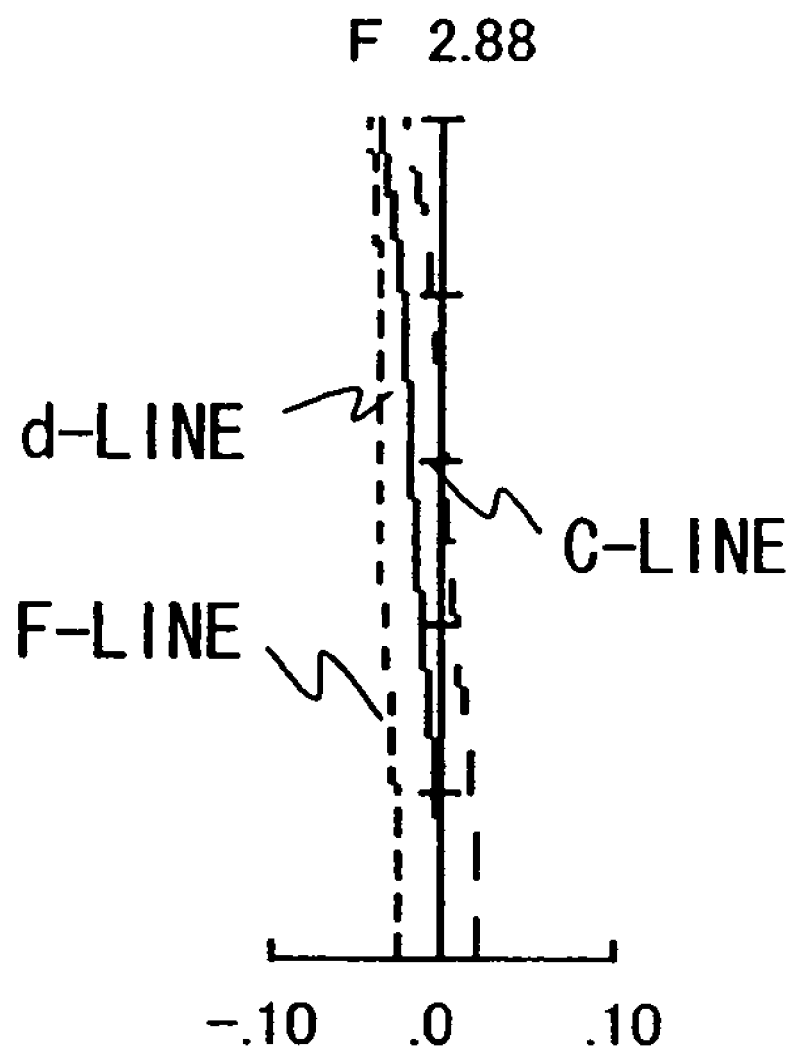
FIG. 4A is a longitudinal aberration diagram of a zoom lens system according to Example 2.
Figure 4B:
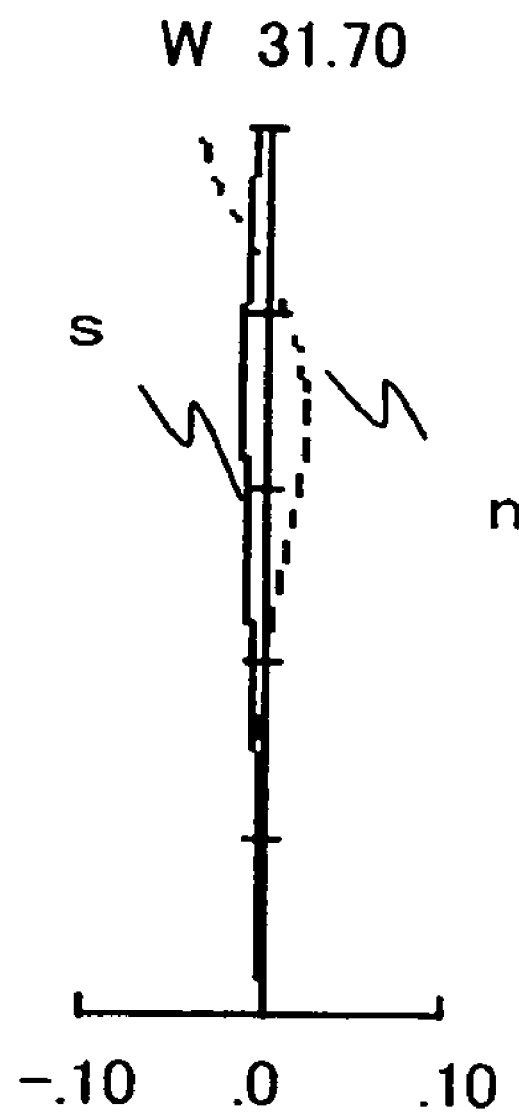
FIG. 4B is a longitudinal aberration diagram of a zoom lens system according to Example 2.
Figure 4C:
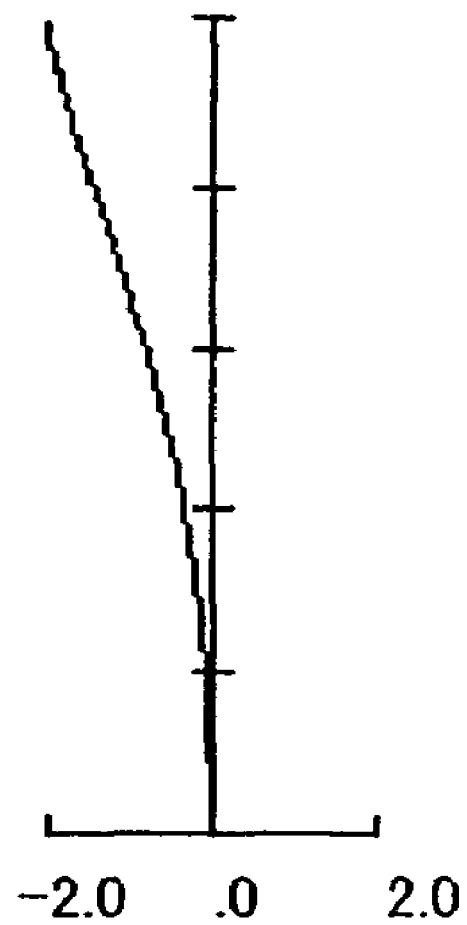
FIG. 4C is a longitudinal aberration diagram of a zoom lens system according to Example 2.
Figure 4D:
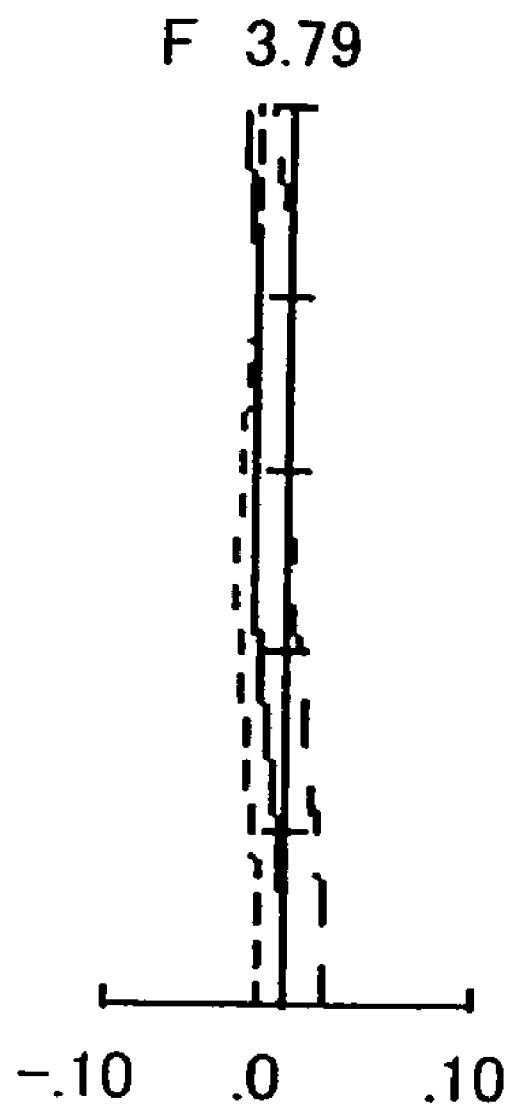
FIG. 4D is a longitudinal aberration diagram of a zoom lens system according to Example 2.
Figure 4E:
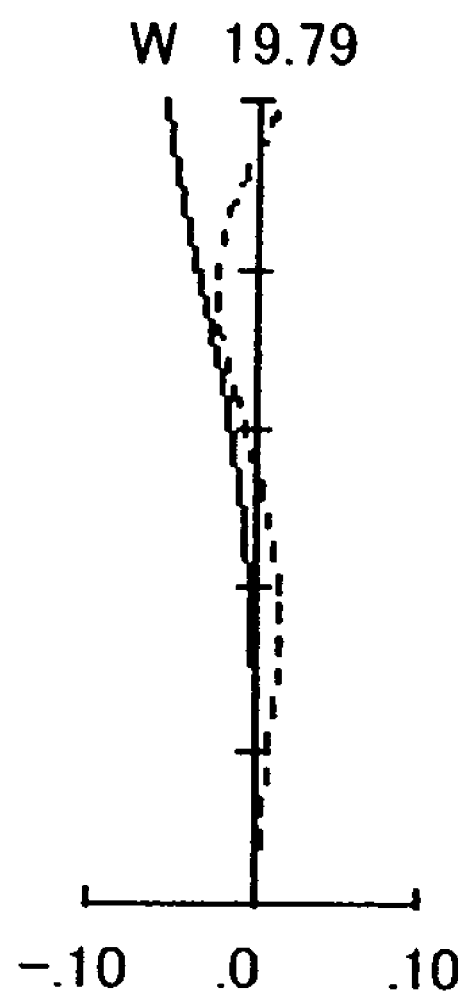
FIG. 4E is a longitudinal aberration diagram of a zoom lens system according to Example 2.
Figure 4F:
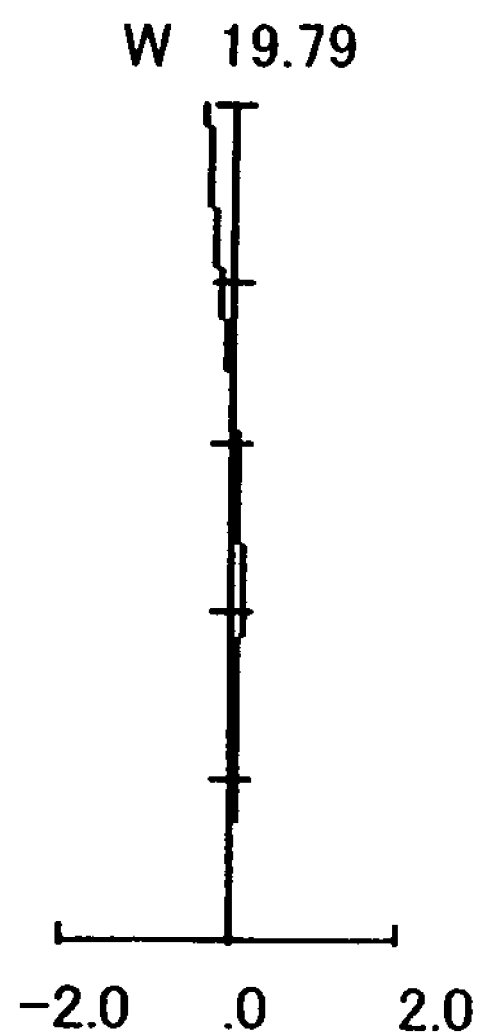
FIG. 4F is a longitudinal aberration diagram of a zoom lens system according to Example 2.
Figure 4G:
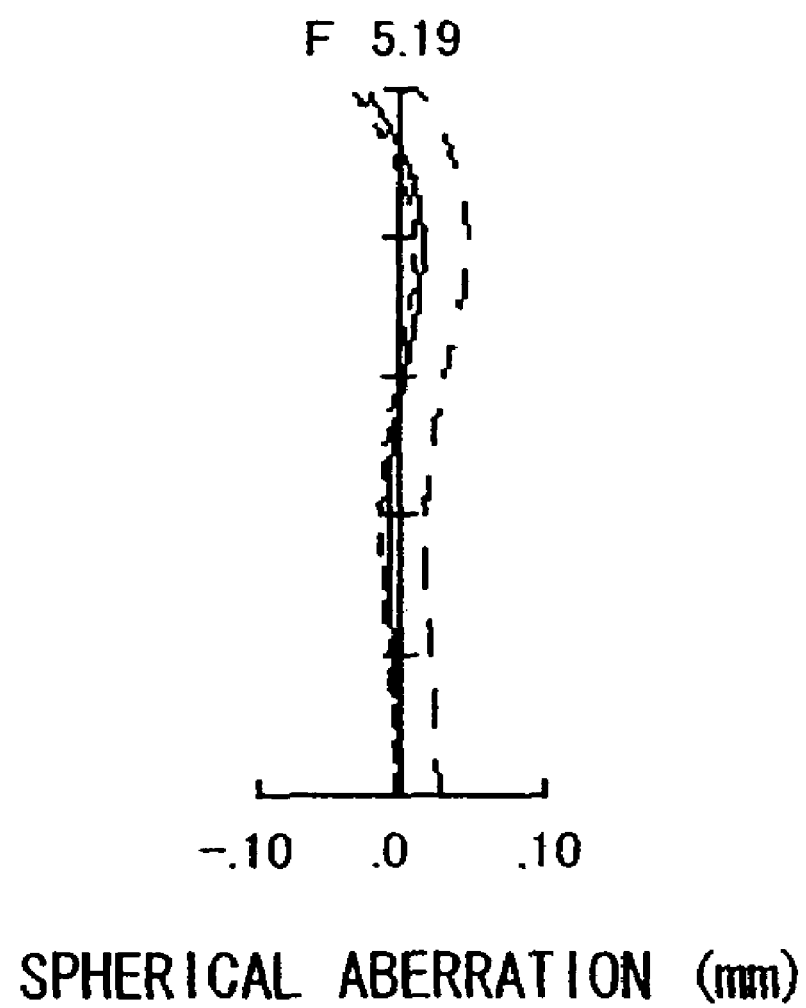
FIG. 4G is a longitudinal aberration diagram of a zoom lens system according to Example 2.
Figure 4H:
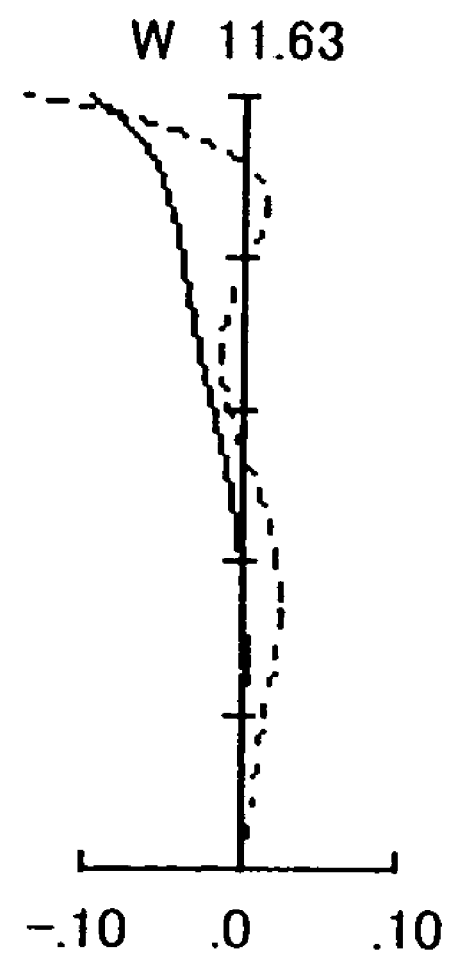
FIG. 4H is a longitudinal aberration diagram of a zoom lens system according to Example 2.
Figure 41:
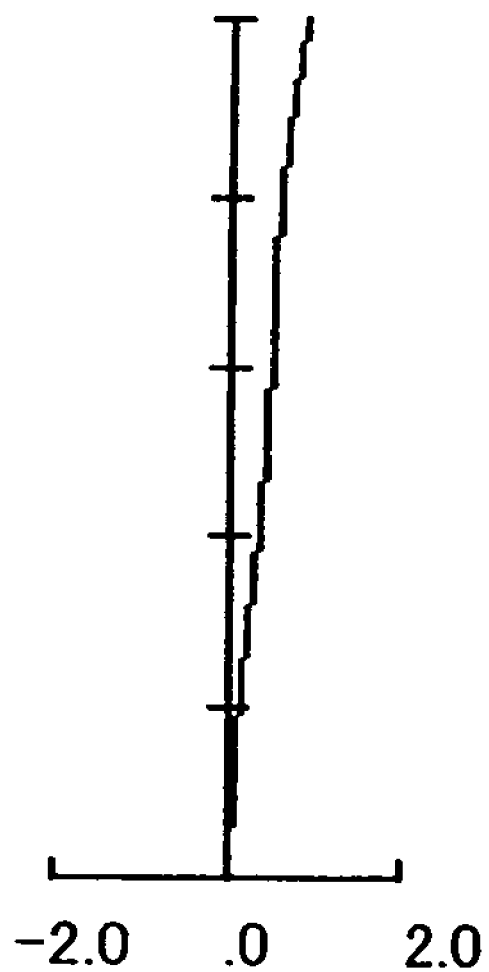
Figure 5A:
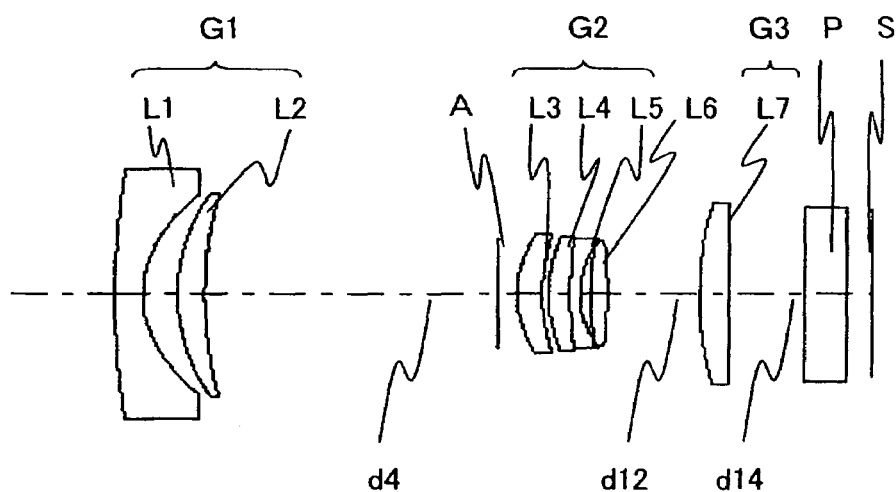
FIG. 5A is a construction diagram of a zoom lens system according to Embodiment 3 (Example 3).
Figure 5B:
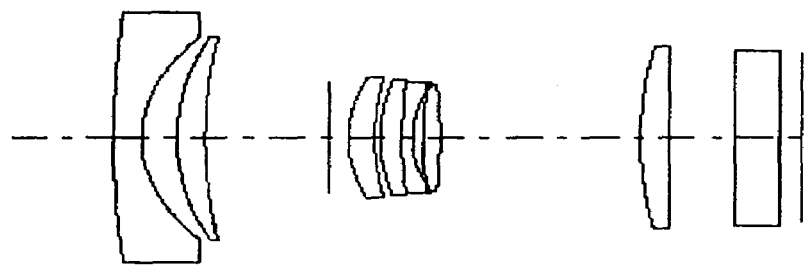
FIG. 5B is a construction diagram of a zoom lens system according to Embodiment 3 (Example 3).
Figure 5C:
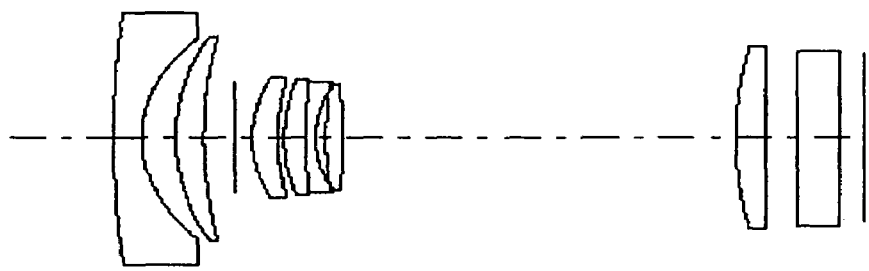
FIG. 5C is a construction diagram of a zoom lens system according to Embodiment 3 (Example 3).
Figure 6A:
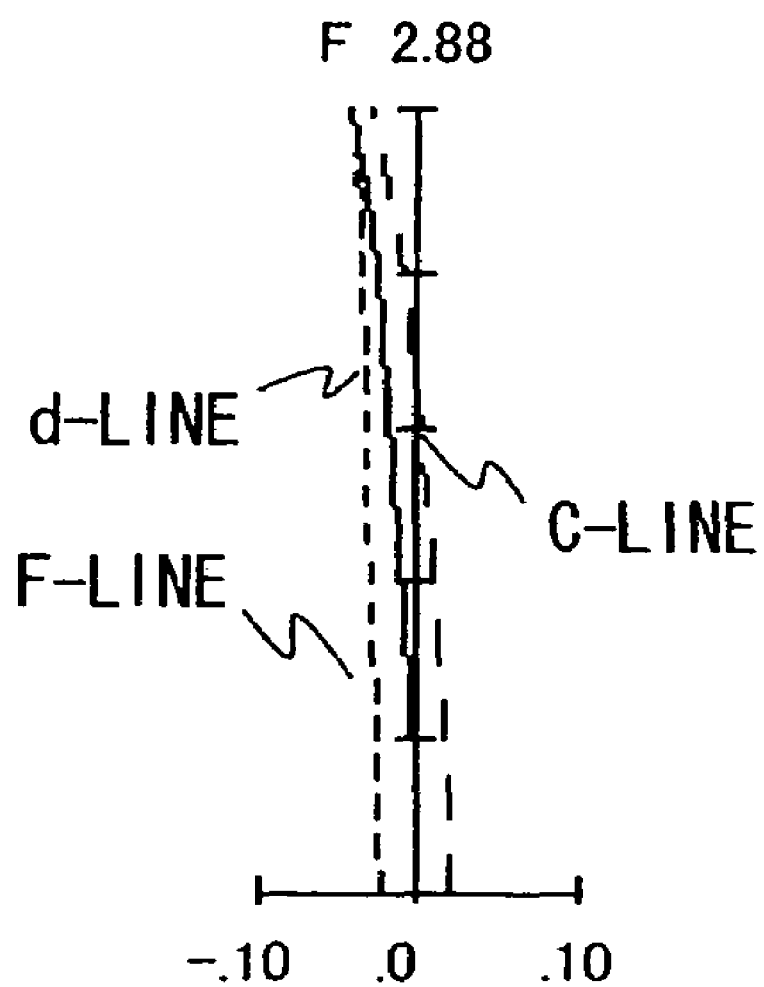
FIG. 6A is a longitudinal aberration diagram of a zoom lens system according to Example 3.
Figure 6B:
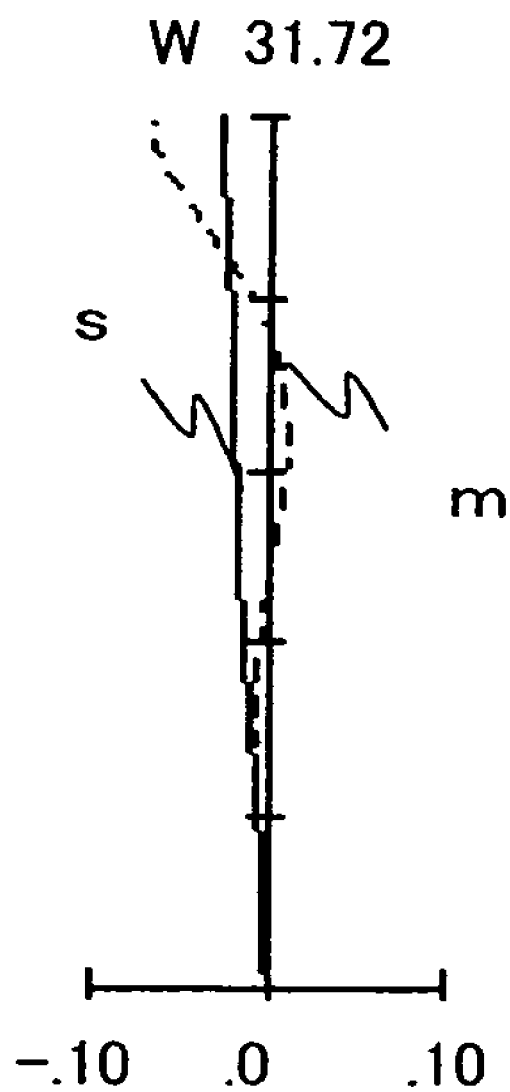
FIG. 6B is a longitudinal aberration diagram of a zoom lens system according to Example 3.
Figure 6C:
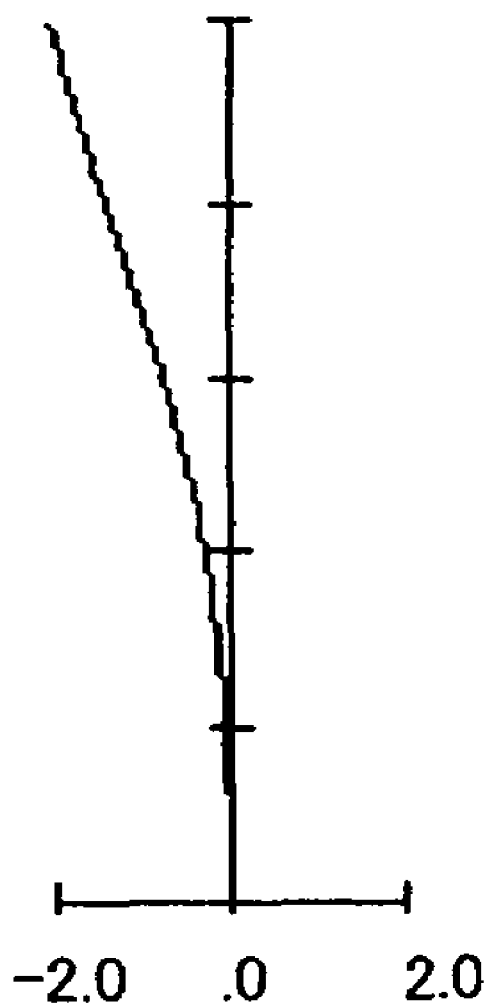
FIG. 6C is a longitudinal aberration diagram of a zoom lens system according to Example 3.
Figure 6D:
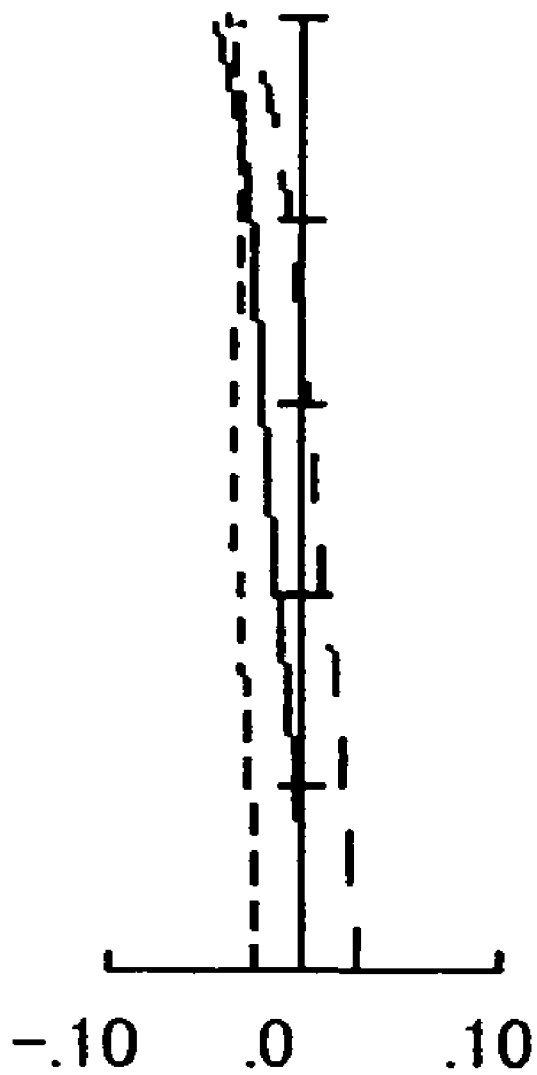
FIG. 6D is a longitudinal aberration diagram of a zoom lens system according to Example 3.
Figure 6E:
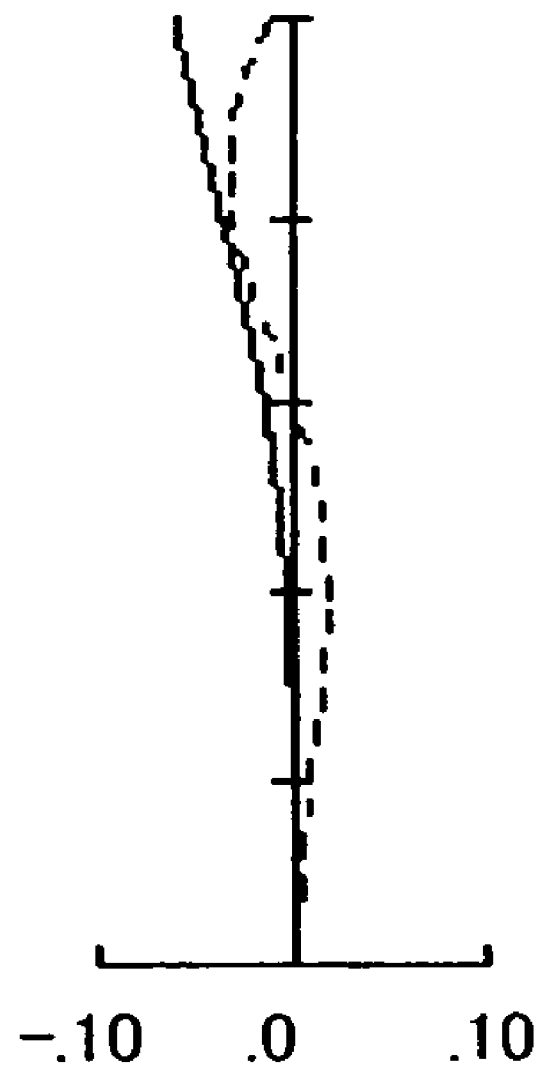
FIG. 6E is a longitudinal aberration diagram of a zoom lens system according to Example 3.
Figure 6F:
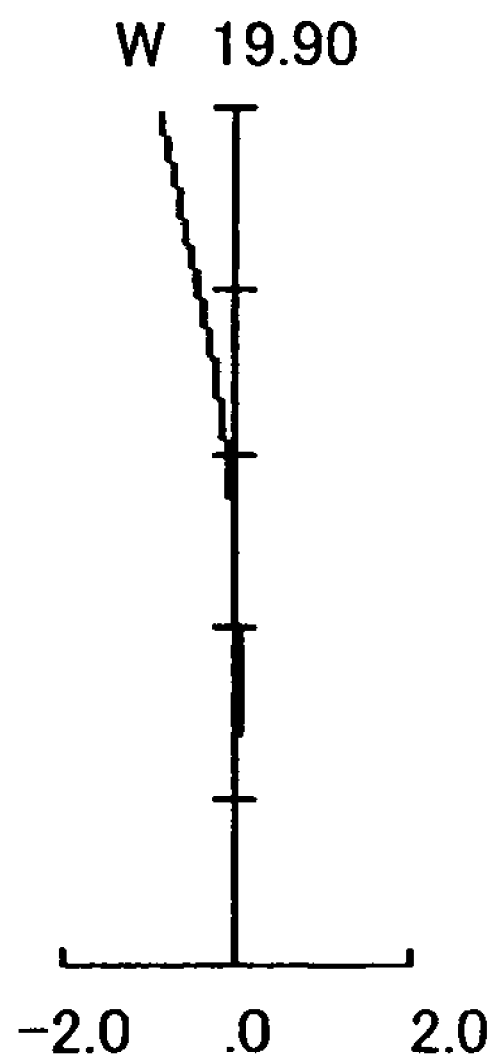
FIG. 6F is a longitudinal aberration diagram of a zoom lens system according to Example 3.
Figure 6G:
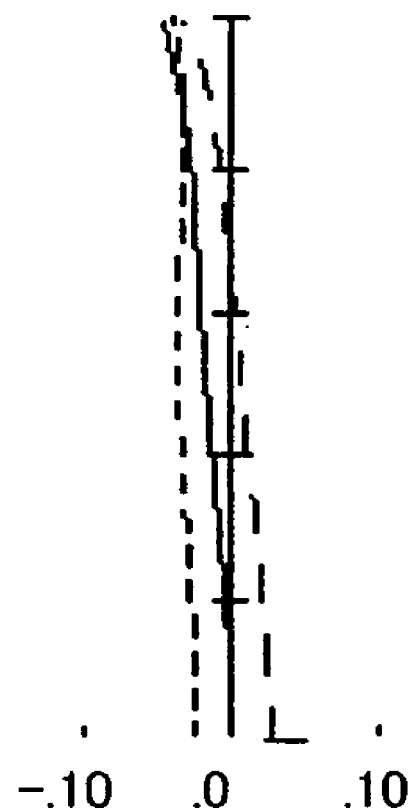
FIG. 6G is a longitudinal aberration diagram of a zoom lens system according to Example 3.
Figure 6H:
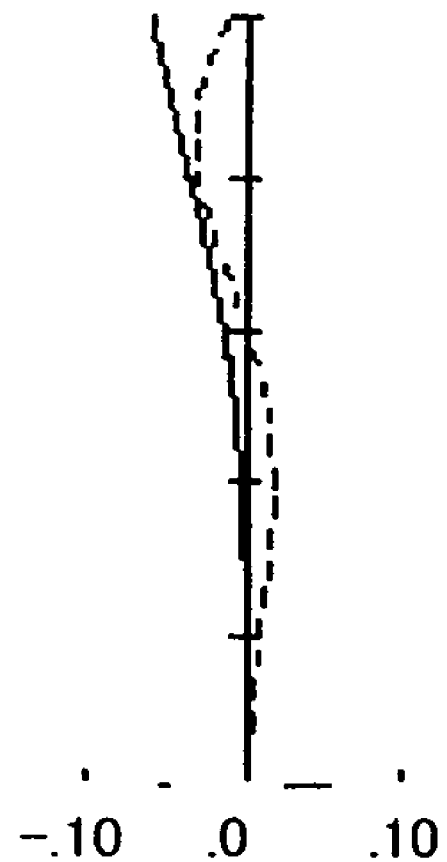
FIG. 6H is a longitudinal aberration diagram of a zoom lens system according to Example 3.
Figure 6I:
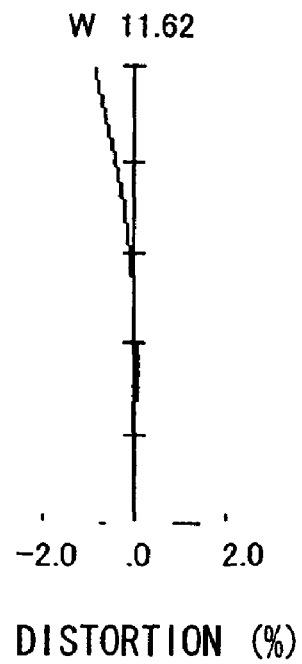
FIG. 6I is a longitudinal aberration diagram of a zoom lens system according to Example 3.
Figure 7A:
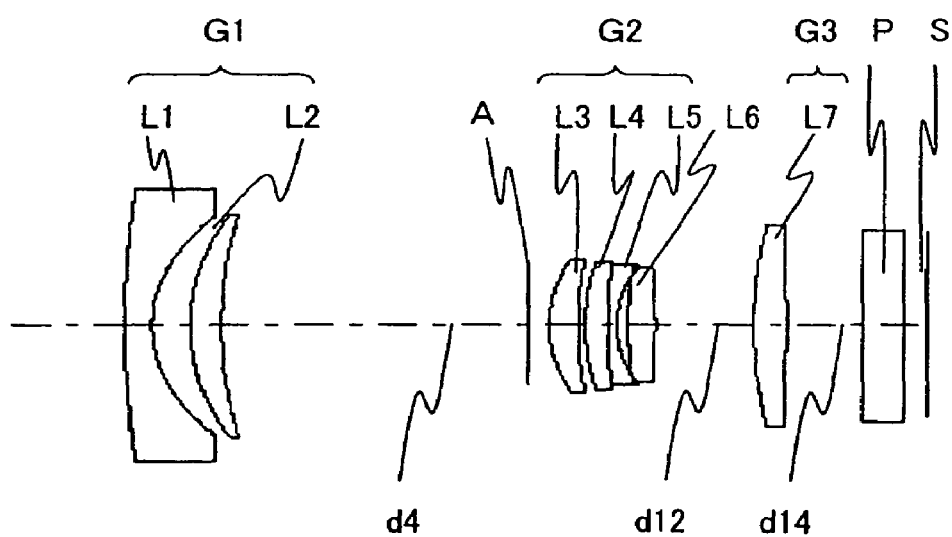
FIG. 7A is a construction diagram of a zoom lens system according to Embodiment 4 (Example 4).
Figure 7B:
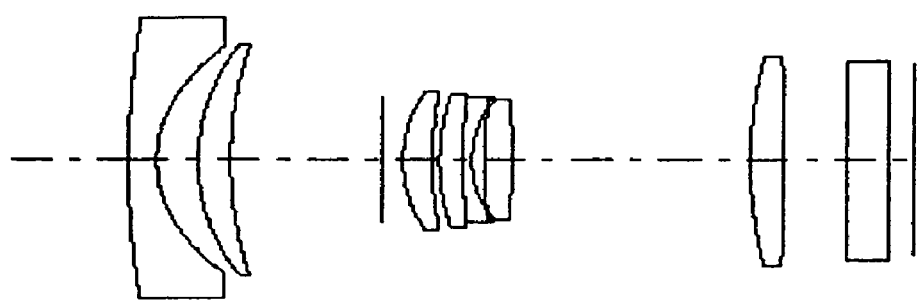
FIG. 7B is a construction diagram of a zoom lens system according to Embodiment 4 (Example 4).
Figure 7C:
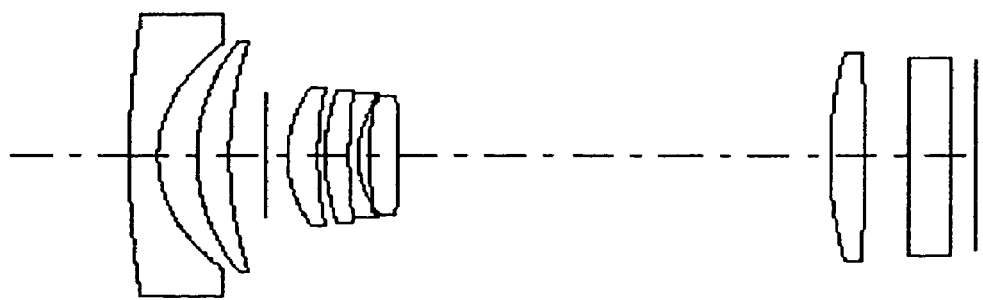
FIG. 7C is a construction diagram of a zoom lens system according to Embodiment 4 (Example 4).
Figure 8A:
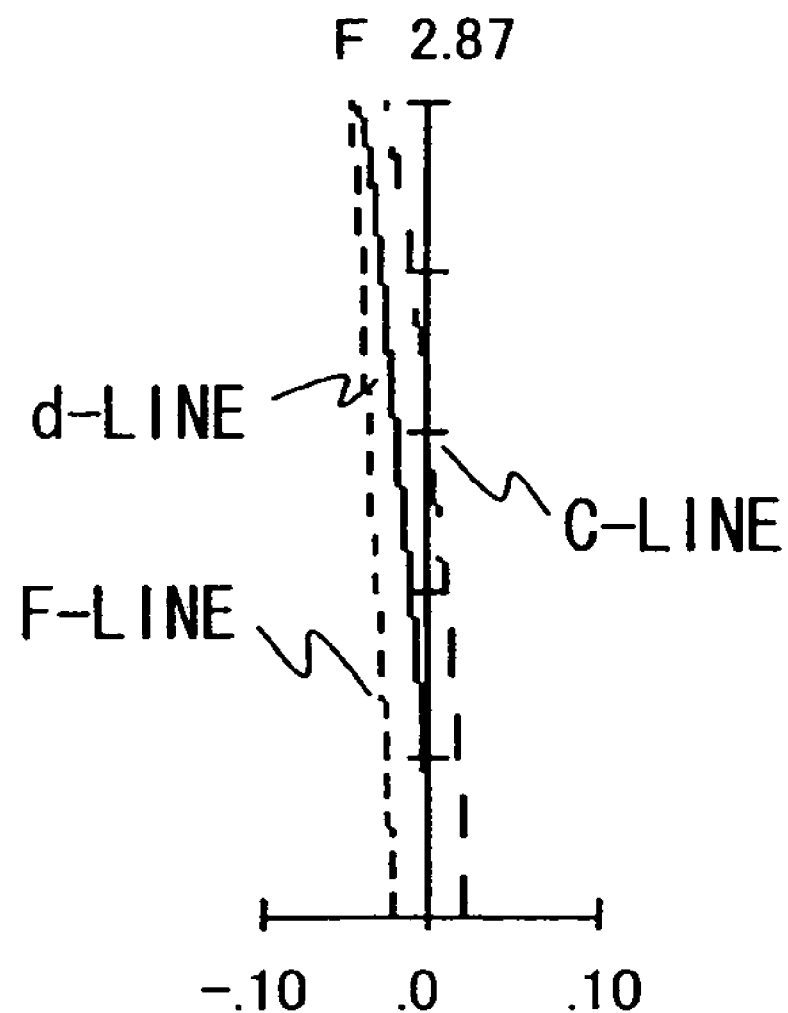
FIG. 8A is a longitudinal aberration diagram of a zoom lens system according to Example 4.
Figure 8B:
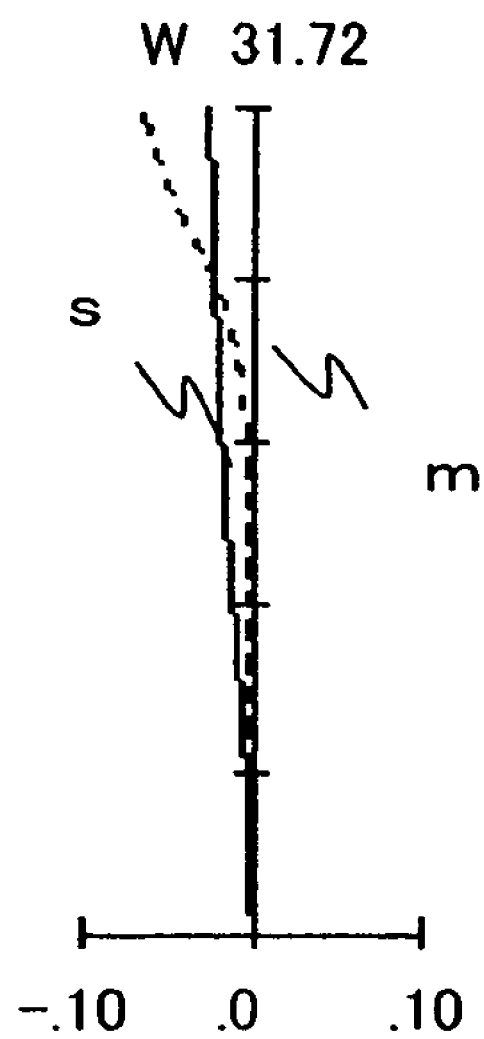
FIG. 8B is a longitudinal aberration diagram of a zoom lens system according to Example 4.
Figure 8C:
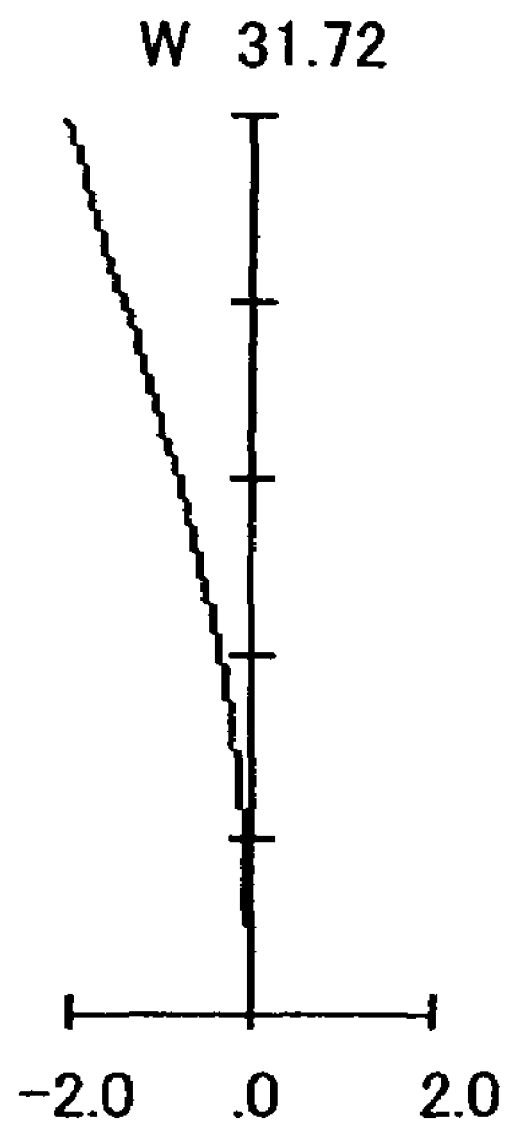
FIG. 8C is a longitudinal aberration diagram of a zoom lens system according to Example 4.
Figure 8D:
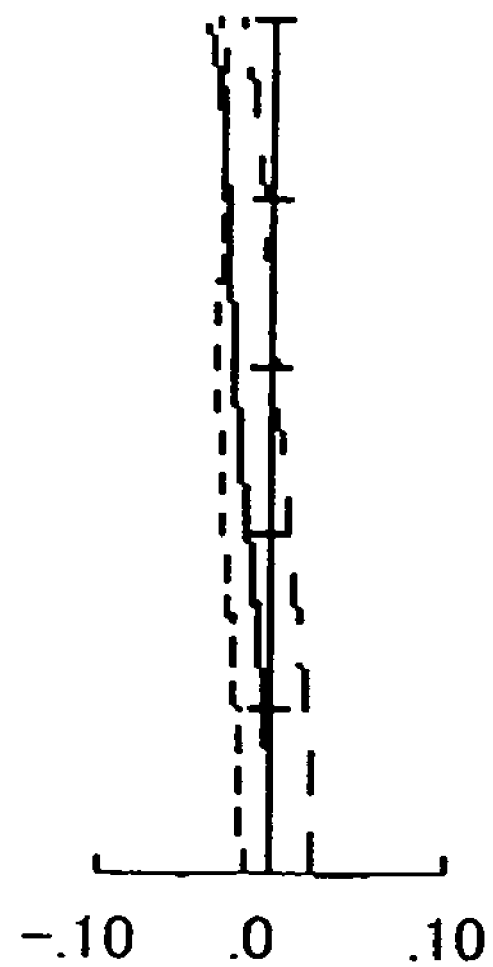
FIG. 8D is a longitudinal aberration diagram of a zoom lens system according to Example 4.
Figure 8E:
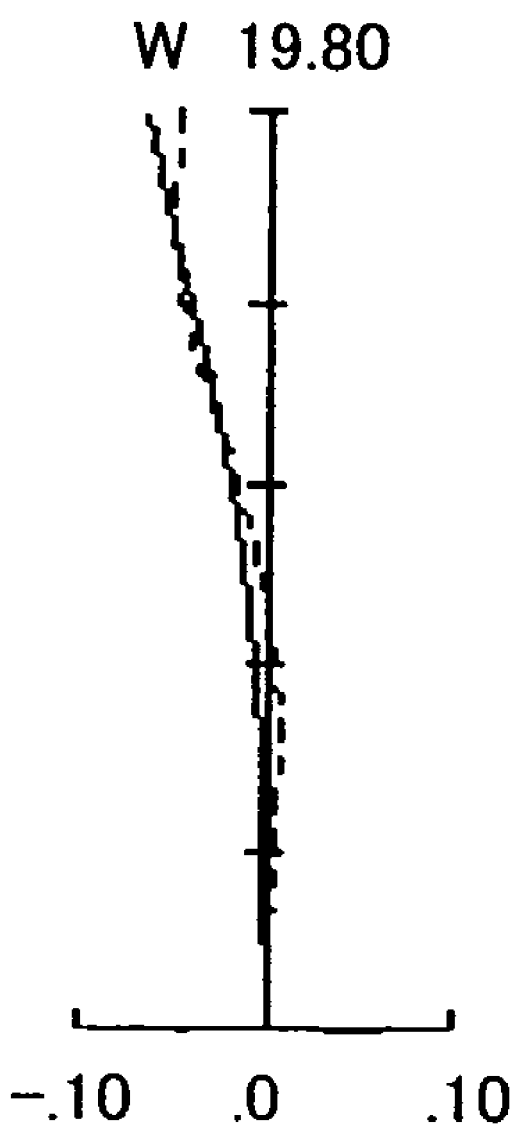
FIG. 8E is a longitudinal aberration diagram of a zoom lens system according to Example 4.
Figure 8F:
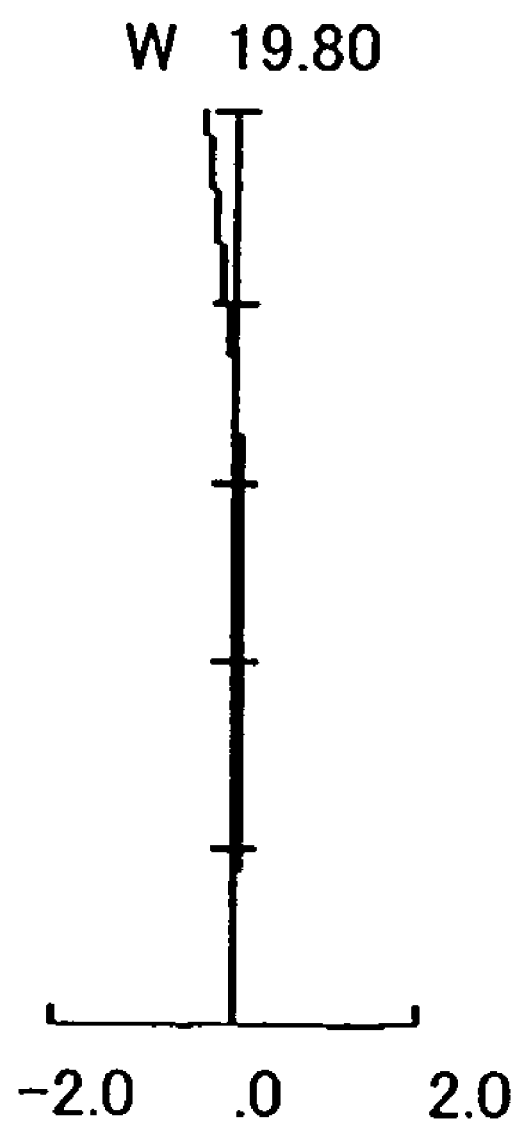
FIG. 8F is a longitudinal aberration diagram of a zoom lens system according to Example 4.
Figure 8G:
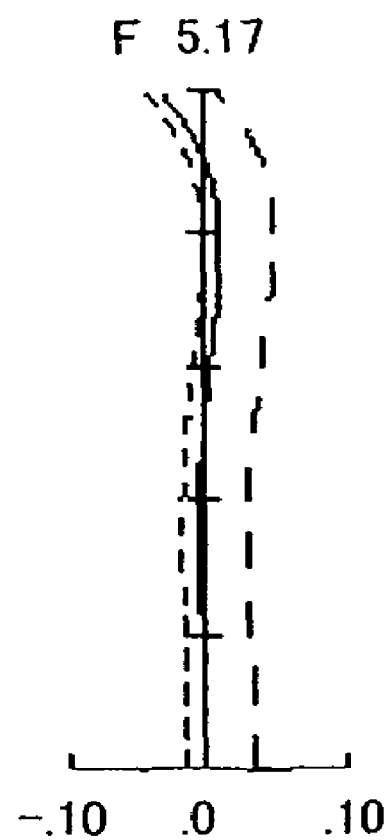
FIG. 8G is a longitudinal aberration diagram of a zoom lens system according to Example 4.
Figure 8H:
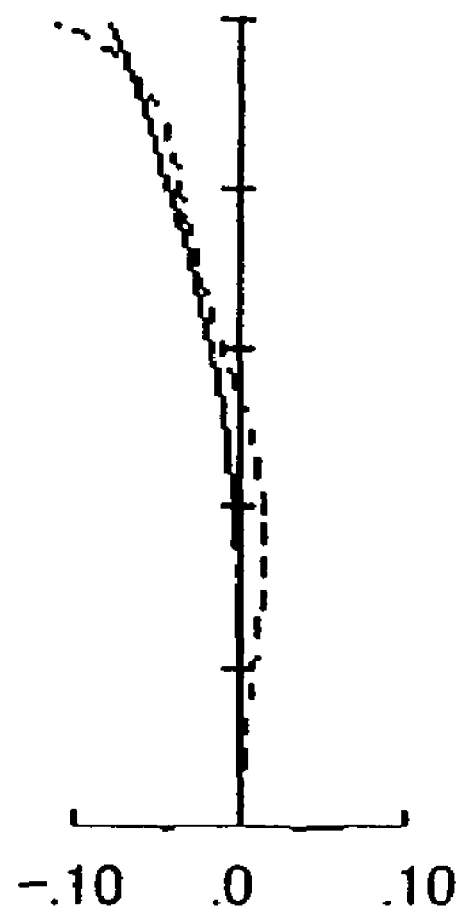
FIG. 8H is a longitudinal aberration diagram of a zoom lens system according to Example 4.
Figure 81:
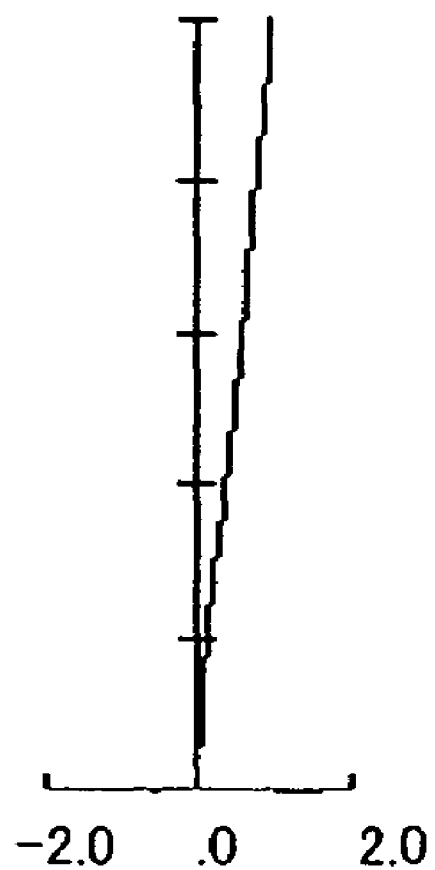
Figure 9A:
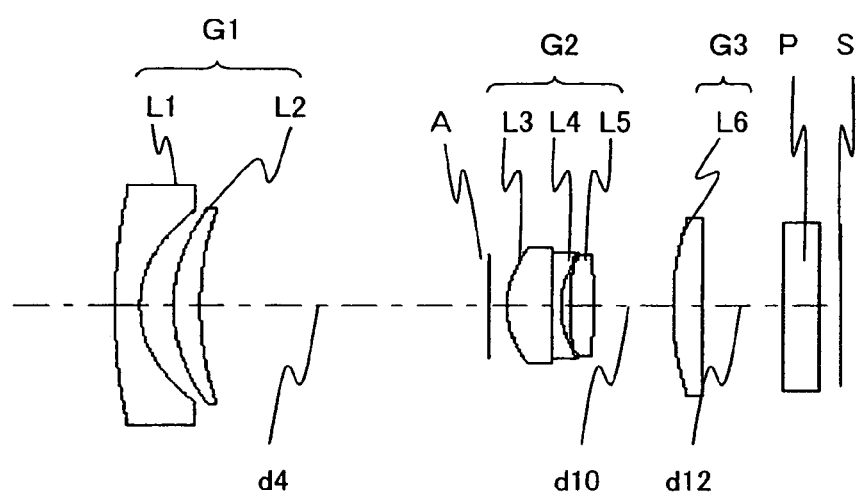
FIG. 9A is a construction diagram of a zoom lens system according to Embodiment 5 (Example 5).
Figure 9B:
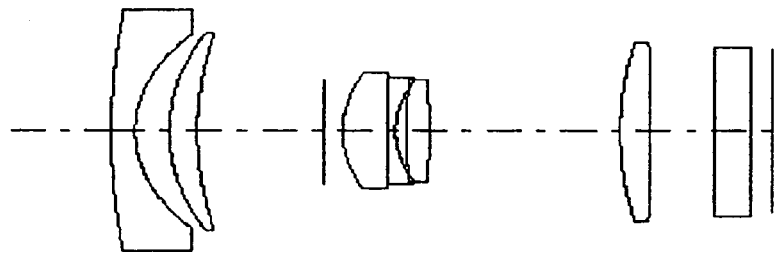
FIG. 9B is a construction diagram of a zoom lens system according to Embodiment 5 (Example 5).
Figure 9C:
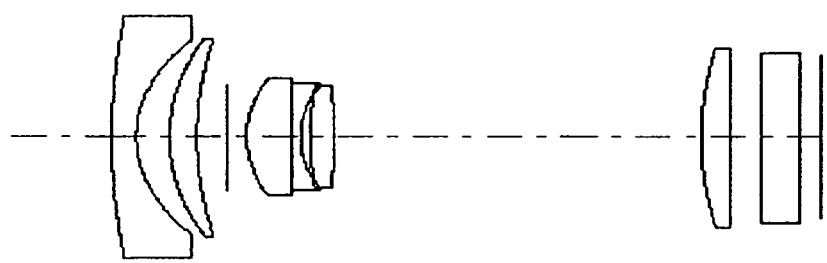
FIG. 9C is a construction diagram of a zoom lens system according to Embodiment 5 (Example 5).
Figure 10A:
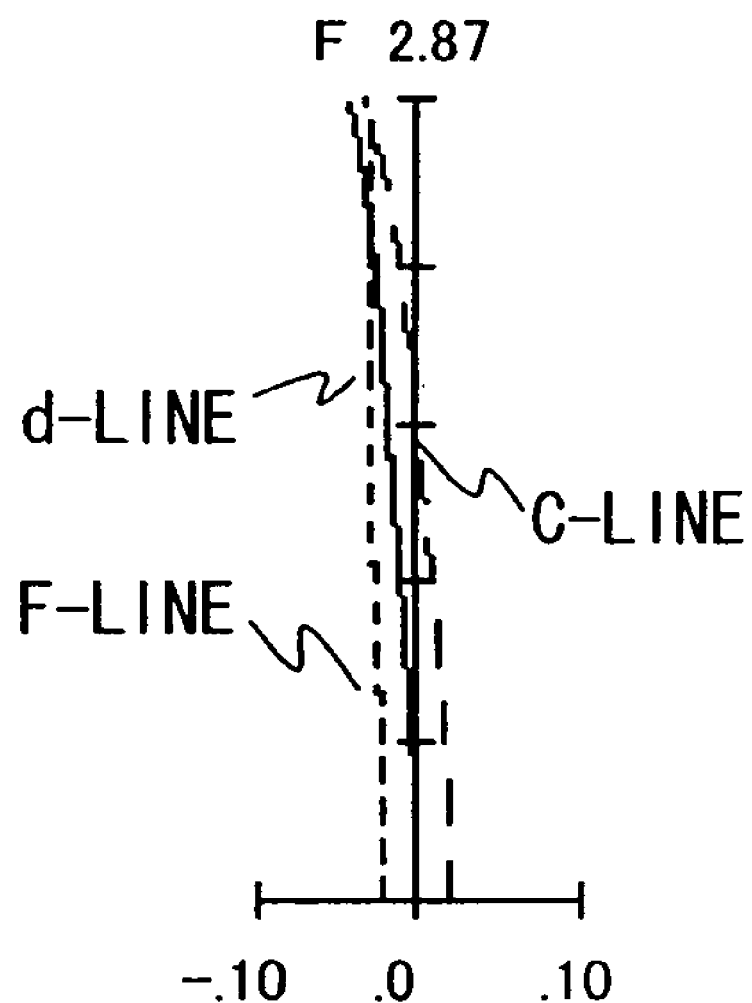
FIG. 10A is a longitudinal aberration diagram of a zoom lens system according to Example 5.
Figure 10B:
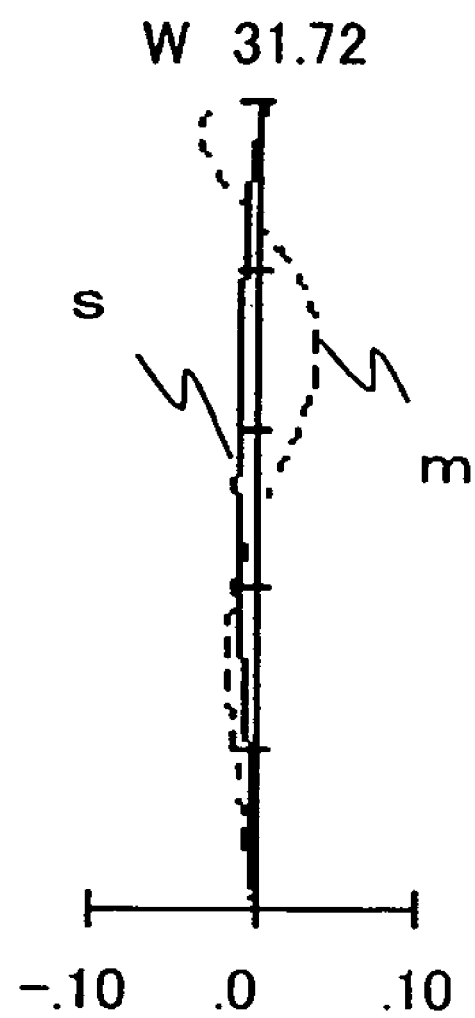
FIG. 10B is a longitudinal aberration diagram of a zoom lens system according to Example 5.
Figure 10C:
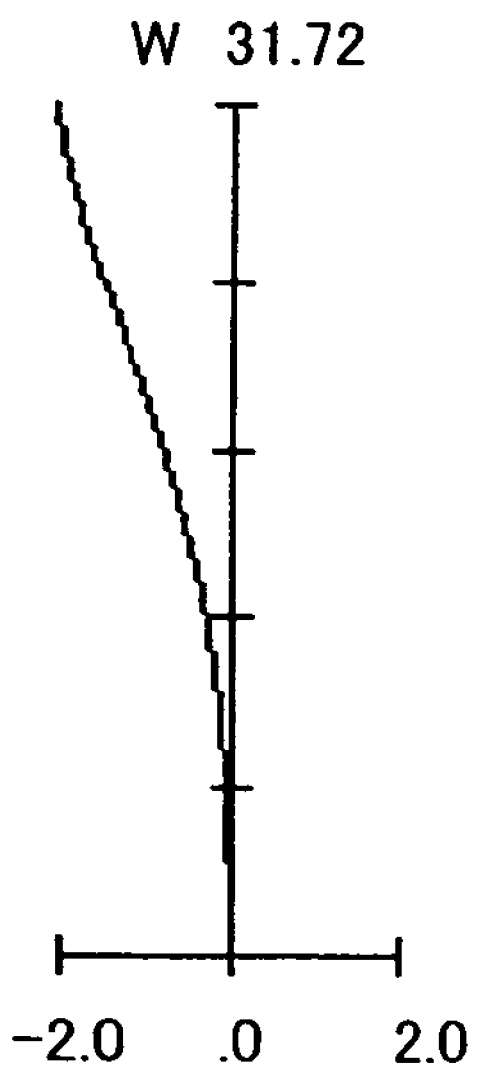
FIG. 10C is a longitudinal aberration diagram of a zoom lens system according to Example 5.
Figure 10D:
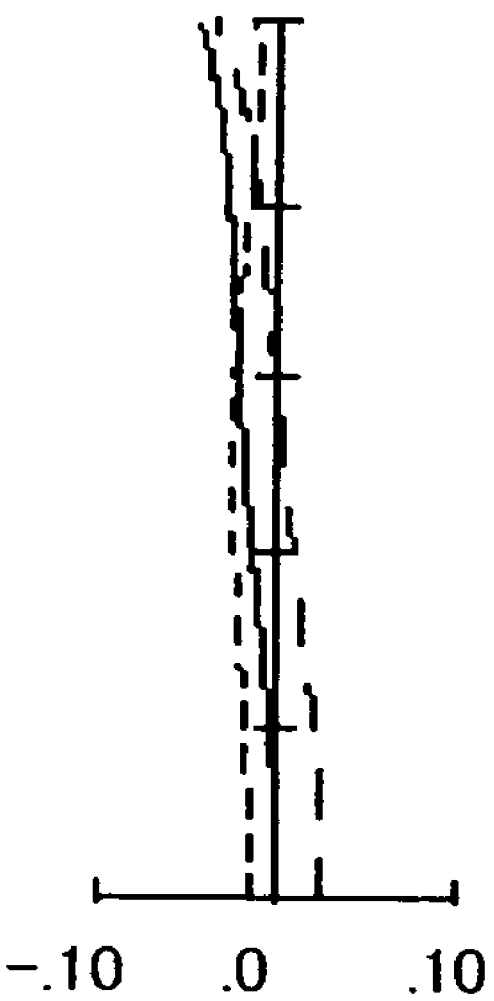
FIG. 10D is a longitudinal aberration diagram of a zoom lens system according to Example 5.
Figure 10E:
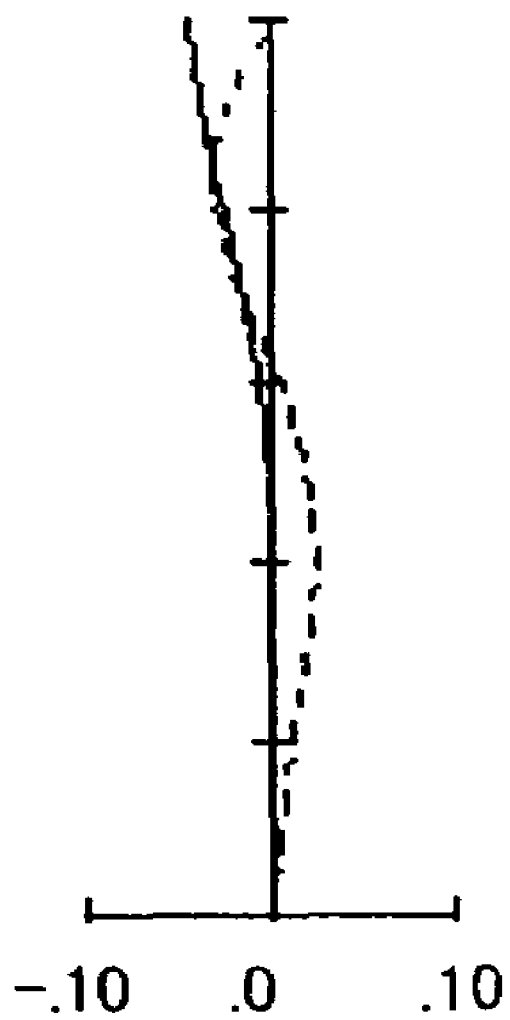
FIG. 10E is a longitudinal aberration diagram of a zoom lens system according to Example 5.
Figure 10F:
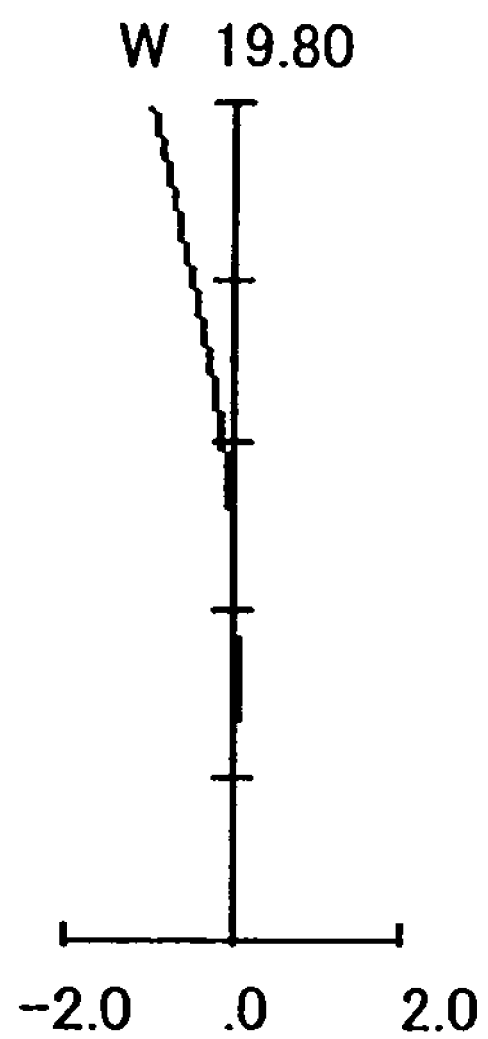
FIG. 10F is a longitudinal aberration diagram of a zoom lens system according to Example 5.
Figure 10G:
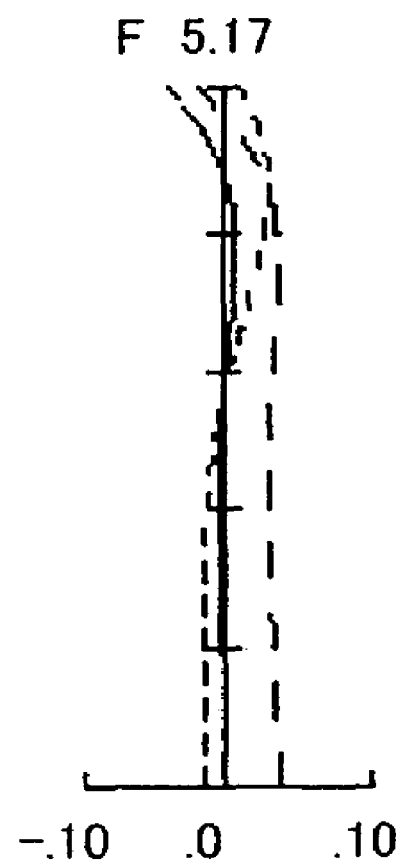
FIG. 10G is a longitudinal aberration diagram of a zoom lens system according to Example 5.
Figure 10H:
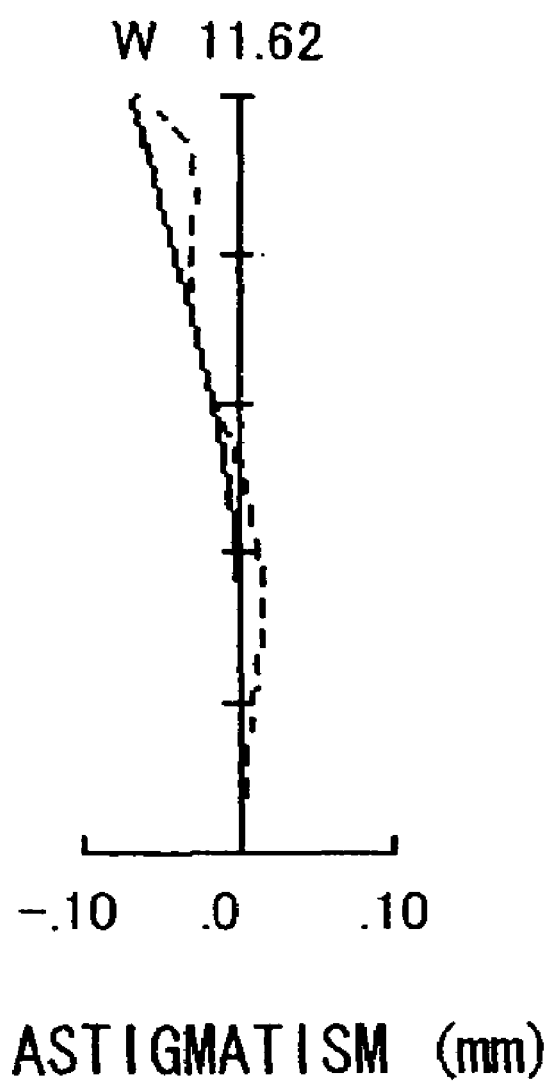
FIG. 10H is a longitudinal aberration diagram of a zoom lens system according to Example 5.
Figure 10I:
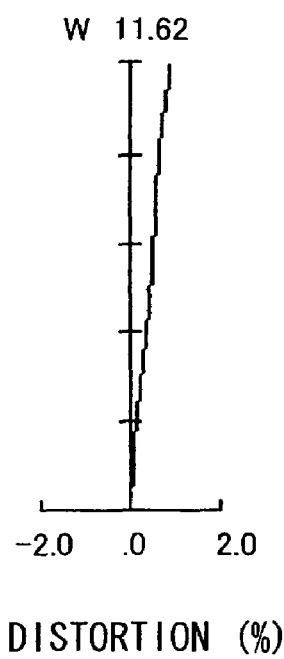
FIG. 10I is a longitudinal aberration diagram of a zoom lens system according to Example 5.
Figure 11A:
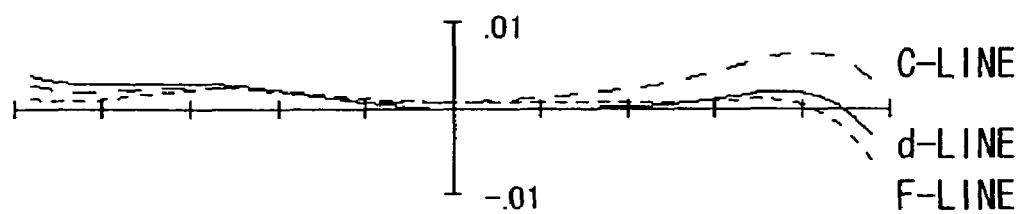
FIG. 11A is a lateral aberration diagram of a zoom lens system according to Example 1 at a telephoto limit.
Figure 11B:
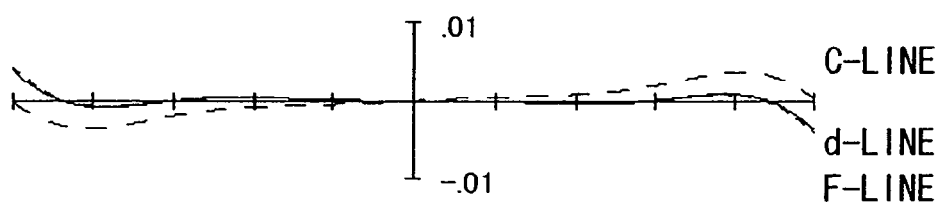
FIG. 11B is a lateral aberration diagram of a zoom lens system according to Example 1 at a telephoto limit.
Figure 11C:
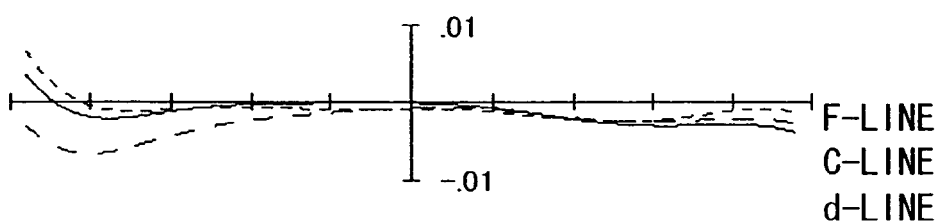
FIG. 11C is a lateral aberration diagram of a zoom lens system according to Example 1 at a telephoto limit.
Figure 11D:
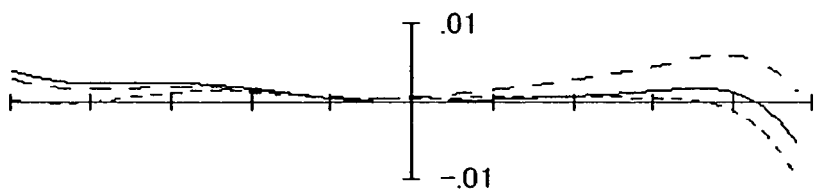
FIG. 11D is a lateral aberration diagram of a zoom lens system according to Example 1 at a telephoto limit.
Figure 11E:
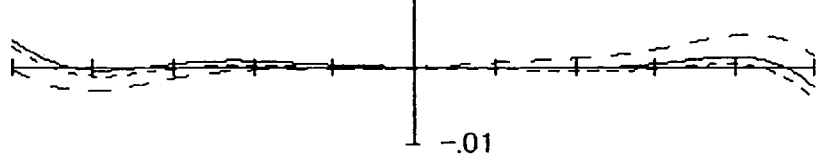
FIG. 11E is a lateral aberration diagram of a zoom lens system according to Example 1 at a telephoto limit.
Figure 11F:
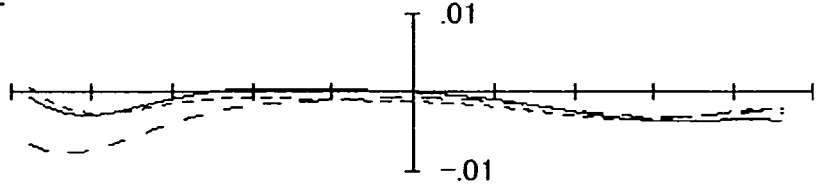
FIG. 11F is a lateral aberration diagram of a zoom lens system according to Example 1 at a telephoto limit.
Figure 12A:
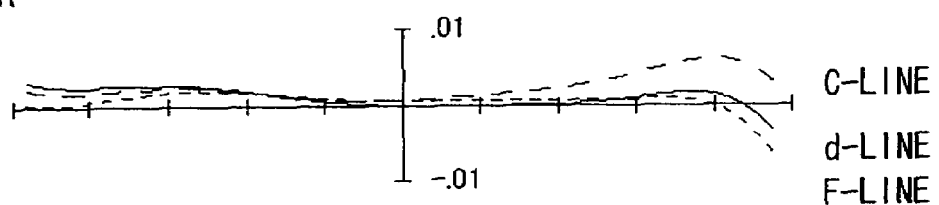
FIG. 12A is a lateral aberration diagram of a zoom lens system according to Example 2 at a telephoto limit.
Figure 12B:
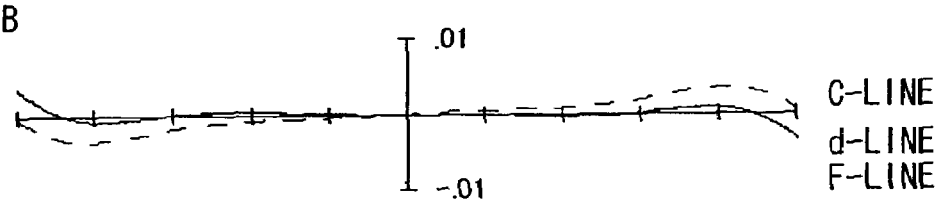
FIG. 12B is a lateral aberration diagram of a zoom lens system according to Example 2 at a telephoto limit.
Figure 12C:
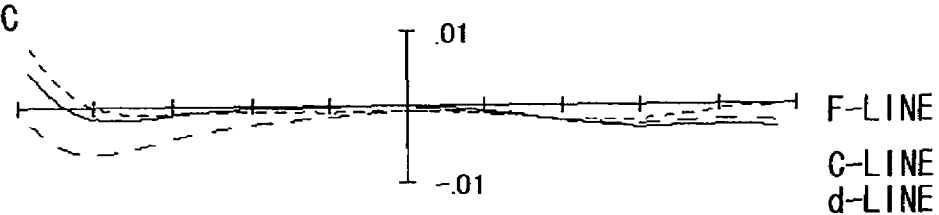
FIG. 12C is a lateral aberration diagram of a zoom lens system according to Example 2 at a telephoto limit.
Figure 12D:
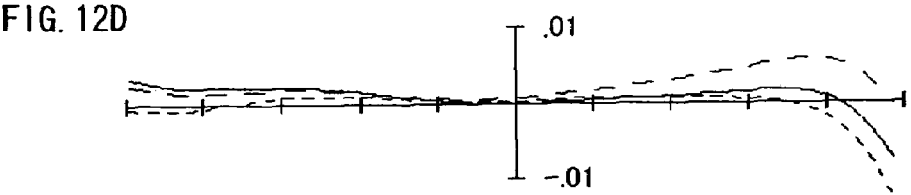
FIG. 12D is a lateral aberration diagram of a zoom lens system according to Example 2 at a telephoto limit.
Figure 12E:
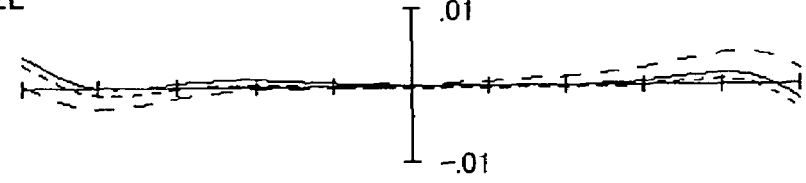
FIG. 12E is a lateral aberration diagram of a zoom lens system according to Example 2 at a telephoto limit.
Figure 12F:
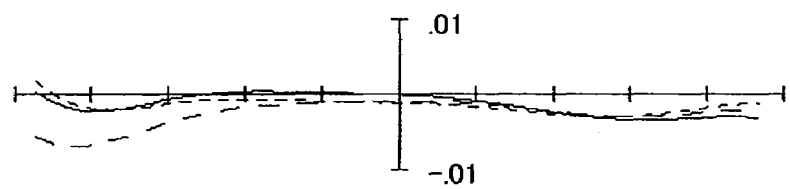
FIG. 12F is a lateral aberration diagram of a zoom lens system according to Example 2 at a telephoto limit.
Figure 13A:
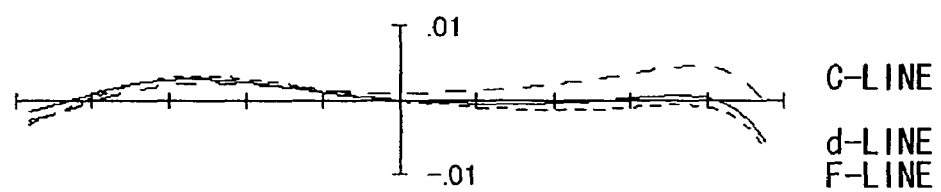
FIG. 13A is a lateral aberration diagram of a zoom lens system according to Example 3 at a telephoto limit.
Figure 13B:
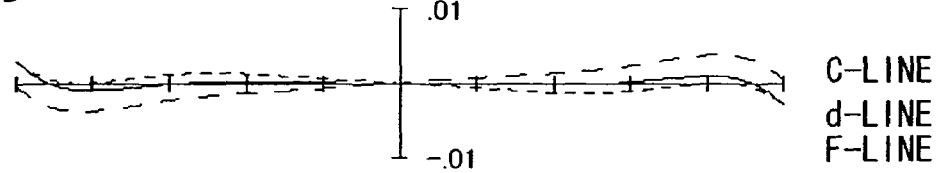
FIG. 13B is a lateral aberration diagram of a zoom lens system according to Example 3 at a telephoto limit.
Figure 13C:
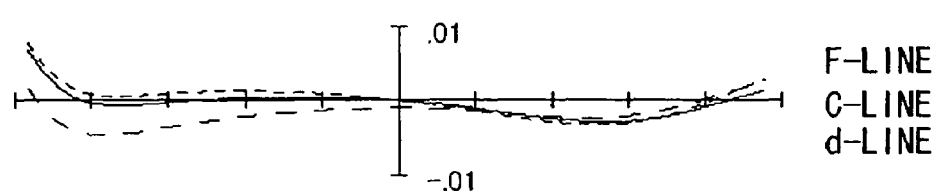
FIG. 13C is a lateral aberration diagram of a zoom lens system according to Example 3 at a telephoto limit.
Figure 13D:
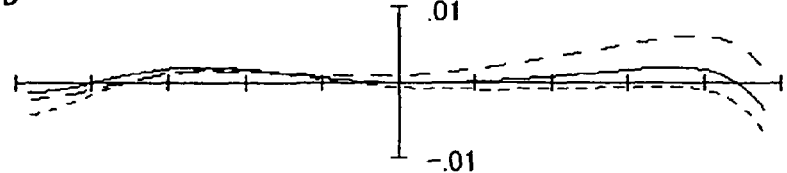
FIG. 13D is a lateral aberration diagram of a zoom lens system according to Example 3 at a telephoto limit.
Figure 13E:
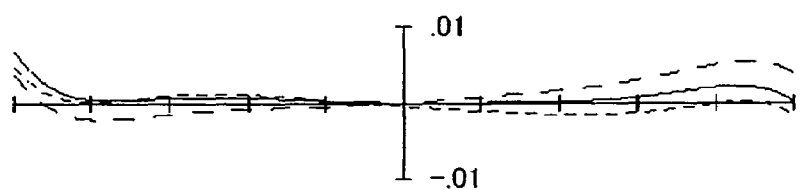
FIG. 13E is a lateral aberration diagram of a zoom lens system according to Example 3 at a telephoto limit.
Figure 13F:
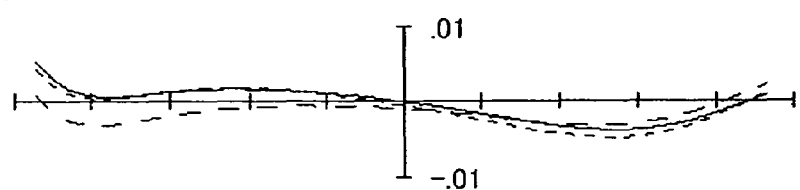
FIG. 13F is a lateral aberration diagram of a zoom lens system according to Example 3 at a telephoto limit.
Figure 14A:
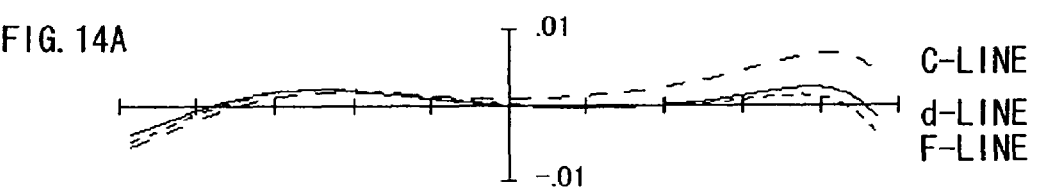
FIG. 14A is a lateral aberration diagram of a zoom lens system according to Example 4 at a telephoto limit.
Figure 14B:
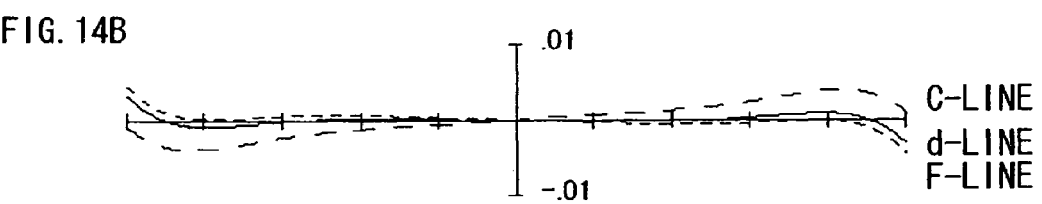
FIG. 14B is a lateral aberration diagram of a zoom lens system according to Example 4 at a telephoto limit.
Figure 14C:
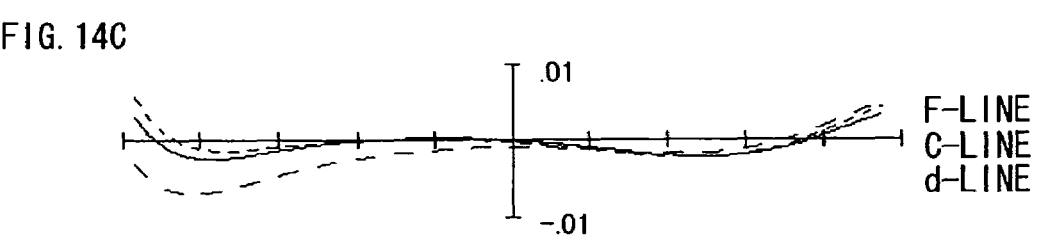
FIG. 14C is a lateral aberration diagram of a zoom lens system according to Example 4 at a telephoto limit.
Figure 14D:
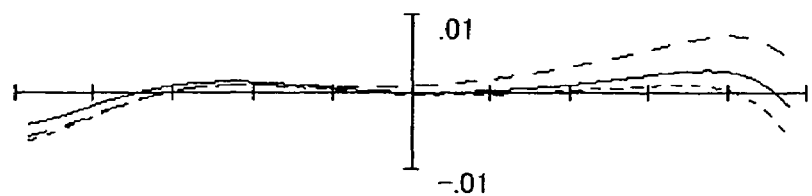
FIG. 14D is a lateral aberration diagram of a zoom lens system according to Example 4 at a telephoto limit.
Figure 14E:
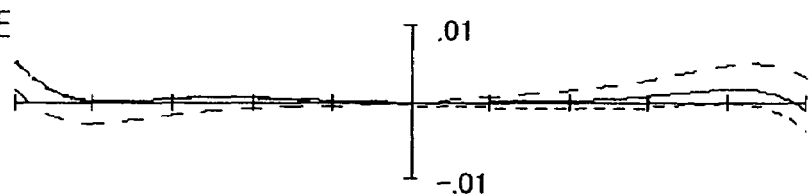
FIG. 14E is a lateral aberration diagram of a zoom lens system according to Example 4 at a telephoto limit.
Figure 14F:
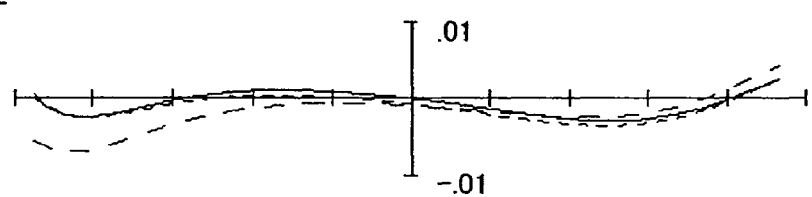
FIG. 14F is a lateral aberration diagram of a zoom lens system according to Example 4 at a telephoto limit.
Figure 15A:
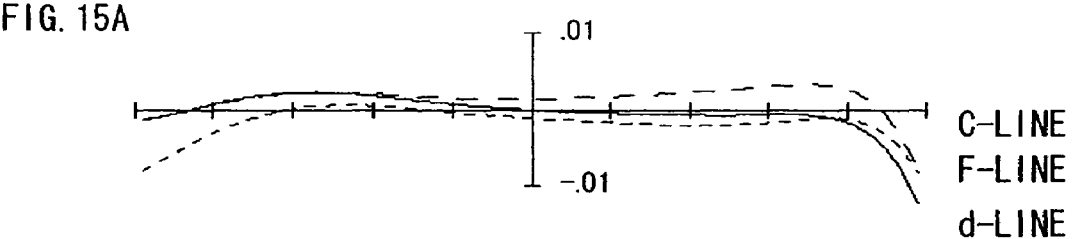
FIG. 15A is a lateral aberration diagram of a zoom lens system according to Example 5 at a telephoto limit.
Figure 15B:
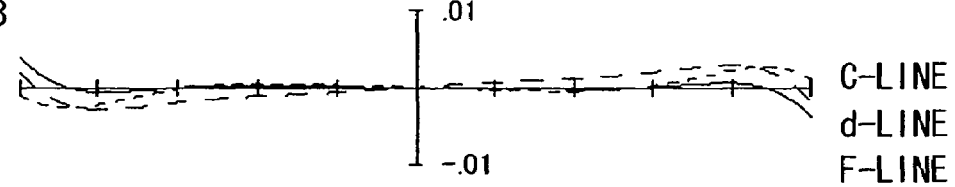
FIG. 15B is a lateral aberration diagram of a zoom lens system according to Example 5 at a telephoto limit.
Figure 15C:
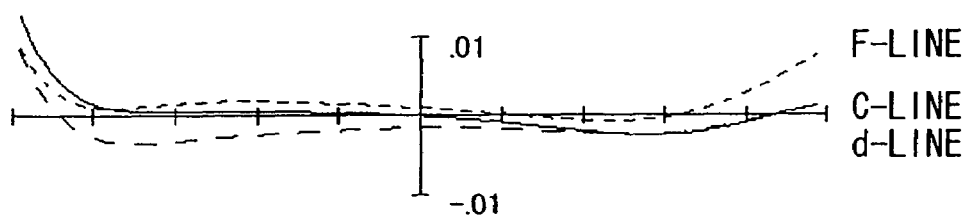
FIG. 15C is a lateral aberration diagram of a zoom lens system according to Example 5 at a telephoto limit.
Figure 15D:
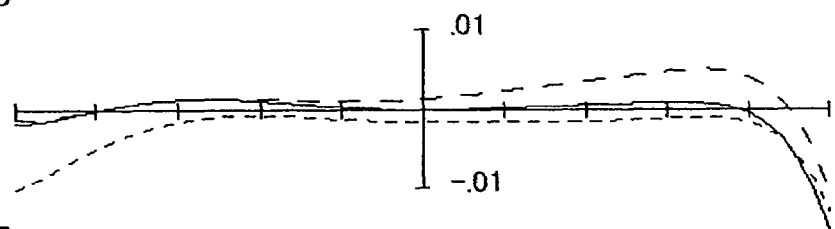
FIG. 15D is a lateral aberration diagram of a zoom lens system according to Example 5 at a telephoto limit.
Figure 15E:
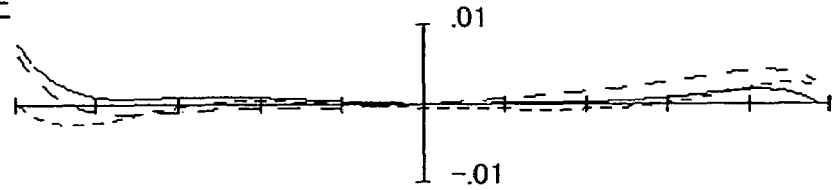
FIG. 15E is a lateral aberration diagram of a zoom lens system according to Example 5 at a telephoto limit.
Figure 15F:
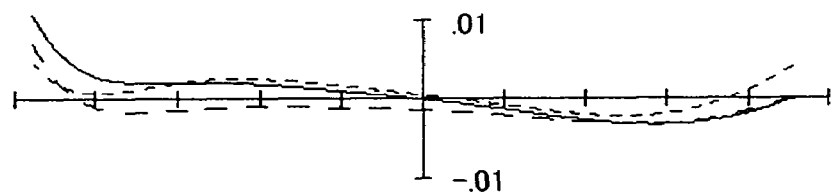
FIG. 15F is a lateral aberration diagram of a zoom lens system according to Example 5 at a telephoto limit.

FIGS. 1A to 1C are construction diagrams of a zoom lens system according to Embodiment 1. FIGS. 3A to 3C are construction diagrams of a zoom lens system according to Embodiment 2. FIGS. 5A to 5C are construction diagrams of a zoom lens system according to Embodiment 3. FIGS. 7A to 7C are construction diagrams of a zoom lens system according to Embodiment 4. FIGS. 9A to 9C are construction diagrams of a zoom lens system according to Embodiment 5. Each figure shows a zoom lens system in an infinity in-focus condition. FIGS. 1A, 3A, 5A, 7A and 9A show the lens construction at a wide-angle limit (the shortest focal length condition: focal length $f_W$). FIGS. 1B, 3B, 5B, 7B and 9B show the lens construction at a middle position (the middle focal length condition: focal length $f_M = \sqrt{(f_W * f_T)}$). FIGS. 1C, 3C, 5C, 7C and 9C show the lens construction at a telephoto limit (the longest focal length condition: focal length $f_T$).

Each zoom lens system according to Embodiments 1 to 5, in order from the object side, comprises a first lens unit G1 of negative optical power, a diaphragm A, a second lens unit G2 of positive optical power and a third lens unit G3 of positive optical power. In the zoom lens system according to Embodiments 1 to 5, in magnification change from the wide-angle limit to the telephoto limit, the first lens unit moves with locus of a convex to the image side, while the second lens unit and the diaphragm monotonically move to the object side, and while the third lens unit moves with locus of a convex or a concave to the image side. Here, in each figure, the straight line described on the rightmost side in the figure indicates the position of the image surface S. On its object side, a plane parallel plate P such as an optical low-pass filter or a face plate of an image sensor is provided. In the zoom lens system according to Embodiments 1 to 5, these lens units are arranged in a desired power construction so that size reduction is achieved in the entire lens system in a state that the optical performance is maintained.

In the zoom lens system according to Embodiments 1 to 5, the first lens unit G1, in order from the object side, comprises a first lens element L1 having a negative meniscus shape with the surface of strong curvature facing the image side and a second lens element L2 which is a positive lens element with the surface of strong curvature facing the object side. Further, in the zoom lens system according to Embodiments 1 to 5, the second lens unit G2 comprises at least three lens elements including an object side lens element of the second lens unit which is a positive lens element arranged on the most object side with the surface of strong curvature facing the object side, and an image side lens element of the second lens unit which is a positive lens element arranged on the most image side with the convex surface facing the object side. Since the zoom lens system according to Embodiments 1 to 5 has the above construction, an optical system is realized in which each lens unit is constructed from a small number of lens elements and which can compactly be accommodated during non-use.

In particular, in the zoom lens system according to Embodiments 1 to 4, the second lens unit G2, in order from the object side, comprises: a third lens element L3 (the most object side lens element of the second lens unit) which is a positive lens element with the surface of strong curvature facing the object side; a fourth lens element L4 which is a positive lens element, a fifth lens element L5 which is a negative lens element; and a sixth lens element L6 (the most image side lens element of the second lens unit) which is a positive lens element with the convex surface facing the object side.

In the zoom lens system according to Embodiments 1 to 4, when the second lens unit G2 is constructed as described above, aberration can sufficiently be compensated. In particular, since the most image side lens element of the second lens unit is constructed from a positive lens element with the convex surface facing the object side, the entire length of the second lens unit G2 can be reduced.

In the zoom lens system according to Embodiment 5, the second lens unit G2, in order from the object side, comprises a third lens element L3 which is a positive lens element with the surface of strong curvature facing the object side, a fourth lens element L4 which is a negative lens element, and a fifth lens element L5 which is a positive lens element with the convex surface facing the object side.

In the zoom lens system according to Embodiment 5, when the second lens unit G2 is constructed as described above, aberration can sufficiently be compensated. In particular, since the most image side lens element of the second lens unit is constructed from a positive lens element with the convex surface facing the object side, the entire length of the second lens unit G2 can be reduced. Further, in comparison with the zoom lens system according to Embodiments 1 to 4, in the zoom lens system according to Embodiment 5, the number of lenses that constitute the second lens unit G2 can be reduced. This reduces the causes of occurrence of decentering aberration during assembling, and hence realizes a zoom lens system which can easily be assembled and adjusted.

Further, in the zoom lens system according to Embodiments 1 to 5, the third lens unit G3 comprises solely one bi-convex positive lens element (a seventh lens element L7 in Embodiments 1, 2 and 4, and a sixth lens element L6 in Embodiment 5), or one plano-convex positive lens element (a seventh lens element L7 in Embodiment 3). The zoom lens system of each embodiment has the above construction, and thereby realizes size reduction during retraction. Further, in the zoom lens system of each embodiment, the third lens unit G3 moves along the optical axis so that focusing is performed from an infinity in-focus condition to a close object in-focus condition.

Conditions are described below that are to be satisfied by the zoom lens system according to each embodiment. Here, a plurality of conditions are set forth that are to be satisfied by the zoom lens system according to each embodiment. Then, the construction of a zoom lens system that satisfies all the conditions is most desirable. However, when an individual condition is satisfied, a zoom lens system can be obtained that achieves the corresponding effect.

The zoom lens system of each embodiment satisfies the following condition (1):

$$|L_W - L_T|/L_W < 0.1 \qquad (1)$$

(here, $Z = f_T/f_W > 2.5$)

where, $L_W$ is an entire optical length at a wide-angle limit, $L_T$ is an entire optical length at a telephoto limit, $f_T$ is a focal length of the entire lens system at a telephoto limit, and $f_W$ is a focal length of the entire lens system at a wide-angle limit.

The condition (1) is a condition for reducing the maximum value of the entire optical length during use and for ensuring satisfactory imaging characteristics. When the maximum value of the entire optical length during use is to be reduced, it is ideal that the entire optical length at a wide-angle limit is made equal to the entire optical length at a telephoto limit. Nevertheless, if the entire optical length at a wide-angle limit were intended to be made strictly equal to the entire optical length at a telephoto limit, imaging characteristics could be degraded in some cases. The condition (1) is a condition obtained in consideration of this situation. When the condition (1) is not satisfied, it becomes difficult to shorten the entire optical length during use and ensure satisfactory imaging characteristics.

In the zoom lens system of each embodiment, it is preferable that the following condition (2) is satisfied;

$$1.9 < f_{G2}/f_W < 2.4 \tag{2}$$

(here, $Z = f_T/f_W > 2.5$)

where, $f_{G2}$ is a focal length of the second lens unit, $f_T$ is a focal length of the entire lens system at a telephoto limit, and $f_W$ is a focal length of the entire lens system at a wide-angle limit.

The condition (2) is a condition for shortening the entire optical length during use as much as possible and for compensating the occurrence of various aberrations with satisfactory balance. When the value of the condition equation exceeds the upper limit, the object-image distance of the second lens unit G2 becomes long so that the entire optical length during use becomes long. In this case, when the magnification of the third lens unit G3 is reduced, the entire optical length becomes short. Nevertheless, since the power of the third lens unit G3 becomes large so that curvature of field generated in the third lens unit G3 becomes under. Thus, the curvature of field becomes difficult to be compensated by the first lens unit G1 and the second lens unit G2. In contrast, when the value of the condition equation goes below the lower limit, although the entire optical length during use becomes short, an air space for allowing a diaphragm to be arranged between the first lens unit G1 and the second lens unit G2 becomes difficult to be ensured at a telephoto limit.

Here, in the zoom lens system of each embodiment, when the range of the condition (2) is set forth as follows, the above effect is achieved more successfully.

$$1.95 < f_{G2}/f_W \tag{2}'$$

$$f_{G2}/f_W < 2.2 \tag{2}''$$

In the zoom lens system of each embodiment, it is preferable that the following condition (3) is satisfied;

$$3.2 < f_{G3}/f_W < 4.0 \tag{3}'$$

(here, $Z = f_T/f_W > 2.5$)

where, $f_{G3}$ is a focal length of the third lens unit, $f_T$ is a focal length of the entire lens system at a telephoto limit, and $f_W$ is a focal length of the entire lens system at a wide-angle limit.

The condition (3) is a condition for reducing the tilt angle of the principal ray that is incident on the solid-state image sensor at the maximum image height, that is, achieving satisfactory telecentric property, and for reducing curvature of field. When the value of the condition equation goes below the lower limit, although the telecentric property becomes satisfactory, curvature of field of the entire lens system cannot be compensated. In contrast, when the value of the condition equation exceeds the upper limit, although the curvature of field is reduced, the telecentric property becomes insufficient.

Here, in the zoom lens system of each embodiment, when the range of the condition (3) is set forth as follows, the above effect is achieved more successfully.

$$3.5 < f_{G3}/f_W \tag{3}'$$

$$f_{G3}/f_W < 3.7 \tag{3}''$$

In the zoom lens system of each embodiment, it is preferable that the following condition (4) is satisfied;

$$0.4 < f_F/f_{G2} < 1.1 \tag{4}$$

where, $f_{G2}$ is a focal length of the second lens unit, and $f_F$ is a focal length of the most object side lens element of the second lens unit.

The condition (4) is a condition for compensating, with satisfactory balance, various aberrations generated in the second lens unit G2 and for shortening the entire optical length of the entire lens system during use. When the value of the condition equation exceeds the upper limit, the deviation of the object side principal point of the second lens unit G2 toward the object side is insufficient. Thus, if the interval from the image side principal point of the first lens unit G1 to the object side principal point of the second lens unit G2 at a telephoto limit were made to be a desired length, a space used for arranging a diaphragm between the first lens unit G1 and the second lens unit G2 would become impossible to be ensured. In contrast, when the value of the condition equation goes below the lower limit, the deviation of the object side principal point of the second lens unit G2 toward the object side becomes sufficient. Thus, a space used for arranging a diaphragm between the first lens unit G1 and the second lens unit G2 can be ensured at a telephoto limit, and at the same time the entire optical length during use can be shortened. Nevertheless, the power of the lens elements provided adjacent to the most object side lens element of the second lens unit becomes excessive. Thus, the spherical aberration and the coma aberration generated in these lens elements become difficult to be compensated with satisfactory balance by other lenses.

Here, in the zoom lens system of each embodiment, when the range of the condition (4) is set forth as follows, the above effect is achieved more successfully.

$$0.5 < f_F/f_{G2} \tag{4}'$$

$$f_F/f_{G2} < 0.8 \tag{4}''$$

In the zoom lens system of each embodiment, it is preferable that the following condition (5) is satisfied;

$$0.9 < f_R/f_{G2} < 1.5 \tag{5}$$

where, $f_{G2}$ is a focal length of the second lens unit, and $f_R$ is a focal length of the most image side lens element of the second lens unit.

The condition (5) is also a condition for compensating, with satisfactory balance, various aberrations generated in the second lens unit G2 and for shortening the entire optical length of the entire lens system during use. When the value of the condition equation goes below the lower limit, the deviation of the object side principal point of the second lens unit G2 toward the object side is insufficient. Thus, if the interval from the image side principal point of the first lens unit G1 to the object side principal point of the second lens unit G2 at a telephoto limit were made to be a desired length, a space used for arranging a diaphragm between the first lens unit G1 and the second lens unit G2 would become impossible to be ensured. In contrast, when the value of the condition equation exceeds the upper limit, the deviation of the object side principal point of the second lens unit G2 toward the object side becomes sufficient. Thus, a space used for arranging a diaphragm between the first lens unit G1 and the second lens unit G2 can be ensured at a telephoto limit, and at the same time the entire optical length during use can be shortened. Nevertheless, the power of the lens elements provided adjacent to the most image side lens element of the second lens unit becomes excessive. Thus, the spherical aberration and the coma aberration generated in these lens elements become difficult to be compensated with satisfactory balance by other lenses.

Here, in the zoom lens system of each embodiment, when the range of the condition (5) is set forth as follows, the above effect is achieved more successfully.

$$1.1 < f_R/f_{G2} \quad (5)'$$

$$f_R/f_{G2} < 1.3 \quad (5)''$$

In the zoom lens system of each embodiment, it is preferable that the following condition (6) is satisfied;

$$3 < r_{1F}/f_W < 10 \quad (6)$$

(here, $Z=f_T/f_W>2.5$)

where, $r_{1F}$ is a radius of curvature of the object side surface of the first lens element, $f_W$ is a focal length of the entire lens system at a wide-angle limit, and $f_T$ is a focal length of the entire lens system at a telephoto limit.

The condition (6) is a condition for restricting the radius of curvature of the object side surface of the first lens element L1 and thereby reducing the negative distortion at a wide-angle limit. When the value of the condition equation goes below the lower limit, the negative distortion at a wide-angle limit becomes small. Nevertheless, the coma aberration and the astigmatism become excessive. Thus, the imaging characteristics in the periphery part of the shot image cannot be made satisfactory. In contrast, when the value of the condition equation exceeds the upper limit, the negative distortion at a wide-angle limit cannot be reduced by the subsequent lens surfaces.

Here, in the zoom lens system of each embodiment, when the range of the condition (6) is set forth as follows, the above effect is achieved more successfully.

$$6 < r_{1F}/f_W \quad (6)'$$

$$r_{1F}/f_W < 7 \quad (6)''$$

In the zoom lens system of each embodiment, it is preferable that the following condition (7) is satisfied;

$$2.0 < r_{2R}/f_W < 3.8 \quad (7)$$

(here, $Z=f_T/f_W>2.5$)

where, $r_{2R}$ is a radius of curvature of the image side surface of the second lens element, $f_W$ is a focal length of the entire lens system at a wide-angle limit, and $f_T$ is a focal length of the entire lens system at a telephoto limit.

The condition (7) is a condition for restricting the radius of curvature of the image side surface of the second lens element L2 and thereby reducing the negative distortion at a wide-angle limit. When the value of the condition equation goes below the lower limit, the absolute value of distortion at a wide-angle limit becomes small. Nevertheless, the coma aberration and the astigmatism become excessive. Thus, the imaging characteristics in the periphery part of the shot image cannot be made satisfactory. In contrast, when the value of the condition equation exceeds the upper limit, the negative distortion at a wide-angle limit cannot be reduced by the subsequent lens surfaces.

Here, in the zoom lens system of each embodiment, when the range of the condition (7) is set forth as follows, the above effect is achieved more successfully.

$$2.8 < r_{2R}/f_W \quad (7)'$$

In the zoom lens system of each embodiment, it is preferable that the following condition (8) is satisfied;

$$0.20 < d_R/f_{G2} \times L_W/f_W < 0.29 \quad (8)$$

(here, $Z=f_T/f_W>2.5$)

where, $d_R$ is an axial distance between the most image side lens element of the second lens unit and the lens surface adjacent thereto on the object side, $f_{G2}$ is a focal length of the second lens unit, $L_W$ is the entire optical length at a wide-angle limit, and $f_W$ is a focal length of the entire lens system at a wide-angle limit.

The condition (8) is a condition for achieving balance between the entire length and the aberration compensation of the second lens unit G2. When the value of the condition equation goes below the lower limit, the spherical aberration and the coma aberration generated in the lens unit G2 become difficult to be compensated with satisfactory balance by other lenses. In contrast, when the value of the condition equation exceeds the upper limit, the axial surface distance between the most image side lens element of the second lens unit and the lens surface which is adjacent to the most image side lens element on the object side becomes large. Thus, the entire optical length during use and the entire length during non-use cannot be shortened.

Here, in the zoom lens system of each embodiment, when the range of the condition (8) is set forth as follows, the above effect is achieved more successfully.

$$0.25 < d_R/f_{G2} \times L_W/f_W \quad (8)'$$

$$d_R/f_{G2} \times L_W/f_W < 0.27 \quad (8)''$$

In the zoom lens system of each embodiment, it is preferable that the following condition (9) is satisfied;

$$1.0 < r_{RF}/f_{G2} < 4.0 \quad (9)$$

where, $f_{G2}$ is a focal length of the second lens unit, and $r_{RF}$ is a radius of curvature of the object side surface of the most image side lens element of the second lens unit.

The condition (9) is also a condition for achieving balance between the entire length and the aberration compensation of the second lens unit G2. When the value of the condition equation goes below the lower limit, the spherical aberration and the coma aberration generated in the lens unit G2 become difficult to be compensated with satisfactory balance by other lenses. In contrast, when the value of the condition equation exceeds the upper limit, the axial surface distance between the most image side lens element of the second lens unit and the lens surface which is adjacent to the most image side lens element on the object side becomes large. Thus, the entire optical length during use and the entire length during non-use cannot be shortened.

Here, in the zoom lens system of each embodiment, when the range of the condition (9) is set forth as follows, the above effect is achieved more successfully.

$$1.5 < r_{RF}/f_{G2} \tag{9}'$$

$$r_{RF}/f_{G2} < 1.7 \tag{9}''$$

In the zoom lens system of each embodiment, it is preferable that the following condition (10) is satisfied;

$$-1.8 < (|r_{RF}| - r_{RR}|)/f_W < -0.2 \tag{10}$$

(here, $Z = f_T/f_W > 2.5$)

where, $r_{RR}$ is a radius of curvature of the image side surface of the most image side lens element of the second lens unit, $r_{RF}$ is a radius of curvature of the object side surface of the most image side lens element of the second lens unit, $f_W$ is a focal length of the entire lens system at a wide-angle limit, and $f_T$ is a focal length of the entire lens system at a telephoto limit.

The condition (10) is also a condition for achieving balance between the entire length and the aberration compensation of the second lens unit G2. When the value of the condition equation goes below the lower limit, the spherical aberration and the coma aberration generated in the lens unit G2 become difficult to be compensated with satisfactory balance by other lenses. In contrast, when the value of the condition equation exceeds the upper limit, the axial surface distance between the most image side lens element of the second lens unit and the lens surface which is adjacent to the most image side lens element on the object side becomes large. Thus, the entire optical length during use and the entire length during non-use cannot be shortened.

Here, in the zoom lens system of each embodiment, when the range of the condition (10) is set forth as follows, the above effect is achieved more successfully.

$$-1 < (|r_{RF}| - r_{RR}|)/f_W \tag{10}'$$

$$(|r_{RF}| - r_{RR}|)/f_W < -0.5 \tag{10}''$$

In the zoom lens system of each embodiment, it is preferable that the following condition (11) is satisfied;

$$2 < r_{RF}/f_W < 5 \tag{11}$$

(here, $Z = f_T/f_W > 2.5$)

where, $r_{RF}$ is a radius of curvature of the object side surface of the most image side lens element of the second lens unit, $f_W$ is a focal length of the entire lens system at a wide-angle limit, and $f_T$ is a focal length of the entire lens system at a telephoto limit.

The condition (11) is also a condition for achieving balance between the entire length and the aberration compensation of the second lens unit G2. When the value of the condition equation goes below the lower limit, the spherical aberration and the coma aberration generated in the lens unit G2 become difficult to be compensated with satisfactory balance by other lenses. In contrast, when the value of the condition equation exceeds the upper limit, the axial surface distance between the most image side lens element of the second lens unit and the lens surface which is adjacent to the most image side lens element on the object side becomes large. Thus, the entire optical length during use and the entire length during non-use cannot be shortened.

Here, in the zoom lens system of each embodiment, when the range of the condition (11) is set forth as follows, the above effect is achieved more successfully.

$$3 < r_{RF}/f_W \tag{11}'$$

$$r_{RF}/f_W < 4 \tag{11}''$$

In the zoom lens system of each embodiment, it is preferable that the following condition (12) is satisfied;

$$0.01 < (r_{RR} + r_{RF})/(r_{RR} - r_{RF}) < 0.3 \tag{12}$$

where, $r_{RR}$ is a radius of curvature of the image side surface of the most image side lens element of the second lens unit, and $r_{RF}$ is a radius of curvature of the object side surface of the most image side lens element of the second lens unit.

The condition (12) is also a condition for achieving balance between the entire length and the aberration compensation of the second lens unit G2. When the value of the condition equation goes below the lower limit, the spherical aberration and the coma aberration generated in the lens unit G2 become difficult to be compensated with satisfactory balance by other lenses. In contrast, when the value of the condition equation exceeds the upper limit, the axial surface distance between the most image side lens element of the second lens unit and the lens surface which is adjacent to the most image side lens element on the object side becomes large. Thus, the entire optical length during use and the entire length during non-use cannot be shortened.

Here, in the zoom lens system of each embodiment, when the range of the condition (12) is set forth as follows, the above effect is achieved more successfully.

$$(r_{RR} + r_{RF})/(r_{RR} - r_{RF}) < 0.2 \tag{12}'$$

In the zoom lens system of each embodiment, it is preferable that the following condition (13) is satisfied;

$$1.2 < (r_{RF} + r_{NR})/(r_{RF} - r_{NR}) < 1.8 \tag{13}$$

where, $r_{NR}$ is a radius of curvature of the lens surface on the object side adjacent to the most image side lens element of the second lens unit, and $r_{RF}$ is a radius of curvature of the object side surface of the most image side lens element of the second lens unit.

The condition (13) is also a condition for achieving balance between the entire length and the aberration compensation of the second lens unit G2. When the value of the condition equation goes below the lower limit, the spherical aberration and the coma aberration generated in the lens unit G2 become difficult to be compensated with satisfactory balance by other lenses. In contrast, when the value of the condition equation exceeds the upper limit, the axial surface distance between the most image side lens element of the second lens unit and the lens surface which is adjacent to the most image side lens element on the object side becomes large. Thus, the entire optical length during use and the entire length during non-use cannot be shortened.

In the zoom lens system of each embodiment, it is preferable that the second lens unit moves in a direction perpendicular to the optical axis so that image blur generated by vibration of the zoom lens system can be compensated, and that the following condition (14) is satisfied;

$$1.7 < (1 - m_{G2T})m_{G3T} < 2.1 \tag{14}$$

where, $m_{G2T}$ and $m_{G3T}$ are a magnification of the second lens unit and a magnification of the third lens unit, respectively, at a wide-angle limit in a case that the shooting distance is ∞.

The condition (14) is a condition equation for achieving satisfactory imaging characteristics during image blur compensation. When the value of the condition equation goes below the lower limit, decentering of the second lens unit G2 necessary for causing decentering in the image by a predetermined amount becomes excessive. Thus, fluctuation in the aberration caused by the parallel movement of the second lens unit G2 becomes large so that the imaging characteristics in the image periphery part is degraded. In contrast, when the value of the condition equation exceeds the upper limit, decentering of the second lens unit G2 necessary for causing decentering in the image by a predetermined amount becomes extremely small. Thus, processes for parallel movement of the second lens unit G2 with high accuracy becomes difficult to be performed. As a result, pixel deviation during shooting cannot be reduced sufficiently. Thus, satisfactory imaging characteristics become difficult to be achieved during image blur compensation.

Here, in order that the imaging characteristics should be achieved more satisfactory, the range of the condition (14) may be set forth as follows. Then, the above effect is achieved more successfully.

$$1.8 < (1 - m_{G2T})m_{G3T} \tag{14}'$$

$$(1 - m_{G2T})m_{G3T} < 2.0 \tag{14}''$$

Here, the lens units constituting each embodiment are composed exclusively of refractive type lenses that deflect the incident light by refraction (that is, lenses of a type in which deflection is achieved at the interface between media each having a distinct refractive index). However, the present invention is not limited to this. For example, each lens unit may be constructed from diffractive type lenses that deflect the incident light by diffraction; refractive-diffractive hybrid type lenses that deflect the incident light by a combination of diffraction and refraction; or gradient index type lenses that deflect the incident light by distribution of refractive index in the medium.

Further, in the zoom lens system according to each embodiment, a reflecting surface may be arranged in the optical path so that the optical path may be bent before or after the zoom lens system or alternatively in the middle. The bending position may be set up arbitrarily depending on the necessity. When the optical path is bent appropriately, thickness reduction in appearance can be achieved in a camera.

Further, in each embodiment, a construction has been given in which a plate is arranged that includes an optical low-pass filter arranged between the final surface of the zoom lens system and the image sensor. This low-pass filter may be: a birefringent type low-pass filter made of, for example, a crystal whose predetermined crystal orientation is adjusted; or a phase type low-pass filter that achieves required characteristics of optical cut-off frequency by diffraction effect. Further, in each embodiment, the low-pass filter may be omitted depending on the characteristics of the solid-state image sensor for receiving the optical image in the zoom lens system.

Embodiment 6

Figure 16:
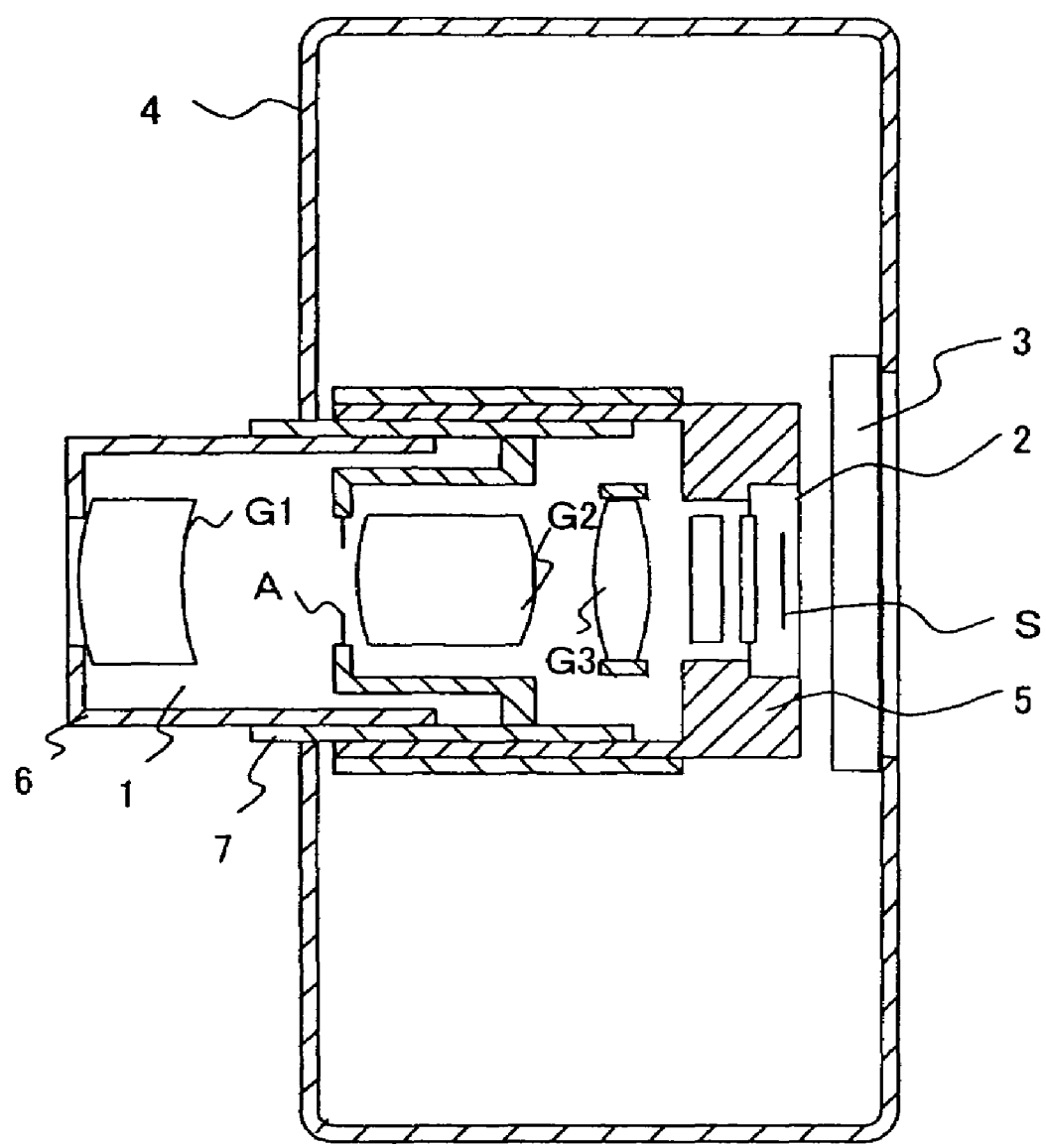
FIG. 16 is a sectional construction diagram of a digital still camera according to Embodiment 6.

FIG. 16 is a sectional construction diagram of a digital still camera according to Embodiment 6. In FIG. 16, the digital still camera comprises: an imaging device including a zoom lens system 1 and a solid-state image sensor 2 that is a CCD; a liquid crystal display monitor 3; a body 4; and the like. The employed zoom lens system 1 is the zoom lens system according to Embodiment 1. In FIG. 16, the zoom lens system 1 comprises a first lens unit G1, a diaphragm A, a second lens unit G2 and a third lens unit G3. In the body 4, the zoom lens system 1 is arranged on the front side, while the solid-state image sensor 2 that is a CCD is arranged on the rear side of the zoom lens system 1. The liquid crystal display monitor 3 is arranged on the rear side of the body 4. An optical image of a photographic object acquired through the zoom lens system 1 is formed in the image surface S.

The solid-state image sensor 2 has a recording pixel number of horizontal 2304×vertical 1728 (approximately 4 million pixels), a pixel pitch of horizontal 2.5 μm×vertical 2.5 μm, and a recording screen size of horizontal 5.76 mm×vertical 4.32 mm (diagonal 7.2 mm). Each pixel has a microscopic positive lens.

A lens barrel comprises a main barrel 5, a moving barrel 6, and a cylindrical cam 7. When the cylindrical cam 7 is rotated, the first lens unit G1, the second lens unit G2, and the third lens unit G3 move to predetermined positions relative to the solid-state image sensor 2, so that magnification can be changed ranging from the wide-angle limit to the telephoto limit. The third lens unit G3 can be moved in the optical axis direction by a motor for focus adjustment.

As such, when the zoom lens system of Embodiment 1 is used in the digital still camera, a digital still camera can be provided that has a zoom ratio of approximately 3, a view angle of 65° or the like at a wide-angle limit, a high resolution, and a thin depth-directional size during non-use. Here, in the digital still camera shown in FIG. 16, any one of the zoom lens systems of Embodiments 2 to 5 may be used in place of the zoom lens system of Embodiment 1. Further, the optical system of the digital still camera shown in FIG. 16 may be used in a digital video camera for moving images. In this case, moving images with high resolution can be acquired in addition to still images.

An imaging device comprising a zoom lens system of Embodiments 1 to 5 described above and an image sensor such as a CCD or a CMOS may be applied to a mobile telephone, a PDA (Personal Digital Assistance), a surveillance camera in a surveillance system, a Web camera, a vehicle-mounted camera or the like.

Further, when an image blur compensation function is to be installed in the digital still camera described above, a mechanism for moving the second lens unit G2 in a direction perpendicular to the optical axis and an image blur compensation motor or the like may be added, and then the image blur compensation motor may be controlled by an image blur compensation signal. The image blur compensation signal may be generated by a publicly known method such as a method of generating from the vibration detection result of the digital still camera detected by a publicly known angular rate sensor or a method of generating by image processing from the image signal formed in the solid-state image sensor.

Further, in the digital still camera described above, a digital zoom function may be installed in which the image formed in the center part of the solid-state image sensor is enlarged to the entire screen by a signal processing circuit. When the digital zoom function is used, the effect by the blur compensation function is remarkably obtained as described below.

The degree of blur unclearness in a case that the zoom lens is inclined by image blur can be evaluated by using the ratio (image decentering ratio) of the amount of image decentering to the diagonal length of the solid-state image sensor. This ratio is constant regardless of the size of printing the signal of the shot image. The diagonal length of the shot image in a case that the digital zoom function is not used is equal to the diagonal length of the effective area of the solid-state image sensor. In contrast, the diagonal length of the shot image in a case that the digital zoom function is used becomes smaller than the diagonal length of the solid-state image sensor. Thus, in a case that the amount of image decentering is constant, when the digital zoom function is used, the image decentering ratio becomes large so that the degree of blur unclearness becomes large.

When the image blur compensation function is used, the amount of image decentering becomes remarkably small. Thus, even when the digital zoom function is used, the image decentering ratio becomes small so that image blur unclearness is improved remarkably.

In the digital still camera shown in FIG. 16, even when the amount of parallel movement of the second lens unit G2 is the same, a difference can arise in the imaging characteristics in some cases depending on the direction of the second lens unit G2. In such cases, when inclination is adjusted in the solid-state image sensor, the difference in the imaging characteristics can be reduced.

Further, in the digital still camera shown in FIG. 16, any one of the zoom lens systems of Embodiments 2 to 5 may be used in place of the zoom lens system of Embodiment 1. Further, in place of the above solid-state image sensor of 4 million pixels, a solid-state image sensor may be used that has a recording pixel number of horizontal 2560×vertical 1920 (approximately 5 million pixels), a pixel pitch of horizontal 2.2 µm×vertical 2.2 µm, and a recording screen size of horizontal 5.632 mm×vertical 4.224 mm (diagonal 7.04 mm).

Numerical examples are described below that are actual implementations of the zoom lens systems according to Embodiments 1 to 5. In the numerical examples, the units of the length in the tables are all "mm". Further, in the numerical examples, r is the radius of curvature, d is the axial distance, nd is the refractive index to the d-line, and vd is the Abbe number to the d-line. In the numerical examples, the surfaces marked with * are aspherical surfaces, and the shapes of aspherical surfaces are defined by the following expression.

$$Z = \frac{\frac{h^2}{r}}{1 + \sqrt{1 - (1+\kappa)(h/r)^2}} + Dh^4 + Eh^6 + Fh^8 + Gh^{10}$$

Here, κ, is the conic constant, while D, E, F and G are the fourth-order, sixth-order, eighth-order and tenth-order aspherical coefficients, respectively.

EXAMPLE 1

A zoom lens system of Example 1 corresponds to that of Embodiment 1 shown in FIGS. 1A to 1C. Table 1 shows the lens data of the zoom lens system of Example 1. Table 3 shows the aspherical data. Table 2 shows the focal length, the F-number, the view angle, the entire optical length and the variable axial distance data, when the shooting distance is ∞.

TABLE 1

| Lens unit | Lens element | Surface | r | d | nd | vd |
|---|---|---|---|---|---|---|
| G1 | L1 | 1 | 41.370 | 1.300 | 1.80470 | 40.97 |
|  |  | 2 | 5.089* | 1.700 |  |  |
|  | L2 | 3 | 8.630 | 1.400 | 1.84666 | 23.78 |
|  |  | 4 | 21.558 | Variable |  |  |
| Diaphragm |  | 5 | ∞ | 0.900 |  |  |
| G2 | L3 | 6 | 4.905* | 1.350 | 1.80431 | 40.87 |
|  |  | 7 | 37.490 | 0.300 |  |  |
|  | L4 | 8 | 17.166 | 0.900 | 1.69680 | 55.48 |
|  | L5 | 9 | −258.388 | 0.400 | 1.80518 | 25.46 |
|  |  | 10 | 4.024 | 0.491 |  |  |
|  | L6 | 11 | 18.693 | 1.200 | 1.72916 | 54.66 |
|  |  | 12 | −21.749 | Variable |  |  |
| G3 | L7 | 13 | 14.894* | 1.500 | 1.60602 | 57.44 |
|  |  | 14 | −92.171 | Variable |  |  |
| P |  | 15 | ∞ | 0.900 | 1.51680 | 64.20 |
|  |  | 16 | ∞ |  |  |  |

TABLE 2

| Axial distance | Wide-angle limit | Middle position | Telephoto limit |
|---|---|---|---|
| d4 | 14.046 | 6.681 | 1.372 |
| d12 | 4.484 | 10.535 | 18.188 |
| d14 | 4.089 | 2.746 | 2.061 |
| F | 5.95 | 10.05 | 17.34 |
| F | 2.87 | 3.77 | 5.17 |
| 2ω | 63.39 | 39.55 | 23.26 |
| L | 35.857 | 33.189 | 34.827 |

TABLE 3

| Surface | κ | D | E | F | G |
|---|---|---|---|---|---|
| 2 | −3.23771E−01 | −2.71367E−04 | −7.36449E−06 | 6.64887E−08 | −1.04739E−08 |
| 6 | −4.29404E−01 | 6.07130E−06 | −9.25169E−06 | 1.68485E−06 | −8.85496E−08 |
| 13 | 0.00000E+00 | −2.08234E−04 | 2.88562E−05 | −1.86680E−06 | 4.45764E−08 |

EXAMPLE 2

A zoom lens system of Example 2 corresponds to that of Embodiment 2 shown in FIGS. 3A to 3C. Table 4 shows the lens data of the zoom lens system of Example 2. Table 6 shows the aspherical data. Table 5 shows the focal length, the F-number, the view angle, the entire optical length and the variable axial distance data, when the shooting distance is ∞.

TABLE 4

| Lens unit | Lens element | Surface | r | d | nd | vd |
|---|---|---|---|---|---|---|
| G1 | L1 | 1 | 40.710 | 1.300 | 1.80470 | 40.97 |
| | | 2 | 5.082* | 1.700 | | |
| | L2 | 3 | 8.639 | 1.350 | 1.84666 | 23.78 |
| | | 4 | 21.603 | Variable | | |
| Diaphragm | | 5 | ∞ | 0.900 | | |
| G2 | L3 | 6 | 4.908* | 1.350 | 1.80431 | 40.87 |
| | | 7 | 37.616 | 0.300 | | |
| | L4 | 8 | 17.169 | 0.900 | 1.69680 | 55.48 |
| | L5 | 9 | −259.359 | 0.400 | 1.80518 | 25.46 |
| | | 10 | 4.023 | 0.491 | | |
| | L6 | 11 | 18.361 | 1.200 | 1.72916 | 54.66 |
| | | 12 | −22.195 | Variable | | |
| G3 | L7 | 13 | 15.375* | 1.500 | 1.60602 | 57.44 |
| | | 14 | −92.171 | Variable | | |
| P | | 15 | ∞ | 1.700 | 1.51680 | 64.20 |
| | | 16 | ∞ | | | |

TABLE 5

| Axial distance | Wide-angle limit | Middle position | Telephoto limit |
|---|---|---|---|
| d4 | 14.012 | 6.724 | 1.372 |
| d12 | 4.134 | 10.332 | 18.007 |
| d14 | 3.573 | 2.130 | 1.452 |
| F | 5.95 | 10.04 | 17.35 |
| F | 2.88 | 3.79 | 5.19 |
| 2ω | 63.40 | 39.58 | 23.26 |
| L | 35.931 | 33.392 | 35.017 |

TABLE 6

| Surface | κ | D | E | F | G |
|---|---|---|---|---|---|
| 2 | −3.30774E−01 | −2.62911E−04 | −7.62645E−06 | 9.85542E−08 | −1.10157E−08 |
| 6 | −4.26592E−01 | 6.37515E−06 | −9.09813E−06 | 1.63787E−06 | −8.66525E−08 |
| 13 | 0.00000E+00 | −2.18482E−04 | 3.25922E−05 | −2.31617E−06 | 6.00396E−08 |

TABLE 7

| Lens unit | Lens element | Surface | r | d | nd | vd |
|---|---|---|---|---|---|---|
| G1 | L1 | 1 | 41.644 | 1.350 | 1.75016 | 45.05 |
| | | 2 | 4.924* | 1.700 | | |
| | L2 | 3 | 8.464 | 1.350 | 1.84666 | 23.78 |
| | | 4 | 18.924 | Variable | | |
| Diaphragm | | 5 | ∞ | 0.900 | | |
| G2 | L3 | 6 | 5.113* | 1.250 | 1.80431 | 40.87 |
| | | 7 | 9.677 | 0.300 | | |
| | L4 | 8 | 7.409 | 1.000 | 1.72916 | 54.66 |
| | L5 | 9 | 19.573 | 0.500 | 1.84666 | 23.78 |
| | | 10 | 4.303 | 0.500 | | |
| | L6 | 11 | 18.981 | 0.800 | 1.77250 | 49.65 |
| | | 12 | −20.696 | Variable | | |
| G3 | L7 | 13 | 14.734* | 1.450 | 1.66547 | 55.18 |
| | | 14 | ∞ | Variable | | |
| P | | 15 | ∞ | 2.040 | 1.51680 | 64.20 |
| | | 16 | ∞ | | | |

TABLE 8

| Axial distance | Wide-angle limit | Middle position | Telephoto limit |
|---|---|---|---|
| d4 | 13.936 | 5.938 | 1.417 |
| d12 | 4.456 | 9.702 | 18.884 |
| d14 | 3.653 | 3.175 | 1.523 |
| F | 5.95 | 10.04 | 17.35 |
| F | 2.88 | 3.67 | 5.18 |
| 2ω | 63.43 | 39.79 | 23.24 |
| L | 36.303 | 33.074 | 36.065 |

EXAMPLE 3

A zoom lens system of Example 3 corresponds to that of Embodiment 3 shown in FIGS. 5A to 5C. Table 7 shows the lens data of the zoom lens system of Example 3. Table 9 shows the aspherical data. Table 8 shows the focal length, the F-number, the view angle, the entire optical length and the variable axial distance data, when the shooting distance is ∞.

TABLE 9

| Surface | κ | D | E | F | G |
|---|---|---|---|---|---|
| 2 | −5.80250E−01 | −6.08937E−05 | 2.71922E−06 | −2.04421E−07 | 2.41794E−09 |
| 6 | −4.59131E−01 | 8.20384E−05 | −1.42292E−06 | 7.67524E−07 | −2.13672E−08 |
| 13 | 0.00000E+00 | −1.88297E−04 | 2.18481E−05 | −1.33504E−06 | 3.12118E−08 |

EXAMPLE 4

A zoom lens system of Example 4 corresponds to that of Embodiment 4 shown in FIGS. 7A to 7C. Table 10 shows the lens data of the zoom lens system of Example 4. Table 12 shows the aspherical data. Table 11 shows the focal length, the F-number, the view angle, the entire optical length and the variable axial distance data, when the shooting distance is ∞.

EXAMPLE 5

A zoom lens system of Example 5 corresponds to that of Embodiment 5 shown in FIGS. 9A to 9C. Table 13 shows the lens data of the zoom lens system of Example 5. Table 15 shows the aspherical data. Table 14 shows the focal length, the F-number, the view angle, the entire optical length and the variable axial distance data, when the shooting distance is ∞.

TABLE 10

| Lens unit | Lens element | Surface | r | d | nd | vd |
|---|---|---|---|---|---|---|
| G1 | L1 | 1 | 37.743 | 1.220 | 1.75016 | 45.05 |
|  |  | 2 | 4.896* | 1.700 |  |  |
|  | L2 | 3 | 8.112 | 1.350 | 1.84666 | 23.78 |
|  |  | 4 | 16.474 | Variable |  |  |
| Diaphragm |  | 5 | ∞ | 0.900 |  |  |
| G2 | L3 | 6 | 5.075* | 1.250 | 1.80431 | 40.87 |
|  |  | 7 | 15.000 | 0.300 |  |  |
|  | L4 | 8 | 8.701 | 1.000 | 1.72916 | 54.66 |
|  | L5 | 9 | 21.624 | 0.400 | 1.84666 | 23.78 |
|  |  | 10 | 4.080 | 0.500 |  |  |
|  | L6 | 11 | 17.789 | 1.200 | 1.77250 | 49.65 |
|  |  | 12 | −27.903 | Variable |  |  |
| G3 | L7 | 13 | 16.588* | 1.450 | 1.66547 | 55.18 |
|  |  | 14 | −94.091 | Variable |  |  |
| P |  | 15 | ∞ | 1.800 | 1.51680 | 64.20 |
|  |  | 16 | ∞ |  |  |  |

TABLE 11

| Axial distance | Wide-angle limit | Middle position | Telephoto limit |
|---|---|---|---|
| d4 | 13.752 | 6.381 | 1.498 |
| d12 | 4.436 | 10.126 | 18.382 |
| d14 | 3.519 | 2.635 | 1.847 |
| F | 5.95 | 10.03 | 17.35 |
| F | 2.87 | 3.73 | 5.17 |
| 2ω | 63.44 | 39.60 | 23.23 |
| L | 35.892 | 33.320 | 35.877 |

TABLE 12

| Surface | κ | D | E | F | G |
|---|---|---|---|---|---|
| 2 | −5.68539E−01 | −2.20900E−05 | 1.75179E−06 | −1.40480E−07 | 1.50825E−09 |
| 6 | −4.61647E−01 | 7.53395E−05 | −2.09075E−06 | 7.17890E−07 | −2.38277E−08 |
| 13 | 0.00000E+00 | −1.87866E−04 | 2.07145E−05 | −1.30562E−06 | 3.21645E−08 |

TABLE 13

| Lens unit | Lens element | Surface | r | d | nd | vd |
|---|---|---|---|---|---|---|
| G1 | L1 | 1 | 29.600 | 1.220 | 1.75016 | 45.05 |
|  |  | 2 | 4.975* | 1.700 |  |  |
|  | L2 | 3 | 8.020 | 1.350 | 1.84666 | 23.78 |
|  |  | 4 | 15.523 | Variable |  |  |
| Diaphragm |  | 5 | ∞ | 0.900 |  |  |
| G2 | L3 | 6 | 4.534* | 2.250 | 1.80431 | 40.87 |
|  | L4 | 7 | −140.533 | 0.400 |  |  |
|  |  | 8 | 3.918 | 0.500 | 1.80518 | 25.46 |
|  | L5 | 9 | 15.679 | 1.200 | 1.77250 | 49.65 |
|  |  | 10 | −22.930 | Variable |  |  |
| G3 | L6 | 11 | 14.578* | 1.450 | 1.66547 | 55.18 |
|  |  | 12 | −466.464 | Variable |  |  |
| P |  | 13 | ∞ | 1.800 | 1.51680 | 64.20 |
|  |  | 14 | ∞ |  |  |  |

TABLE 14

| Axial distance | Wide-angle limit | Middle position | Telephoto limit |
|---|---|---|---|
| d4 | 14.340 | 6.332 | 1.535 |
| d10 | 3.951 | 9.581 | 18.423 |
| d12 | 3.978 | 3.181 | 1.561 |
| F | 2.87 | 3.73 | 5.17 |
| F | 5.95 | 10.03 | 17.35 |
| 2ω | 63.44 | 39.60 | 23.23 |
| L | 35.892 | 33.320 | 35.877 |

TABLE 15

| Surface | κ | D | E | F | G |
|---|---|---|---|---|---|
| 2 | −5.78473E−01 | 4.49113E−05 | −8.66896E−07 | 1.95693E−07 | −6.36070E−09 |
| 6 | −4.65891E−01 | 2.03271E−04 | 1.17108E−06 | 1.15298E−06 | −2.31007E−08 |
| 11 | 0.00000E+00 | −1.97263E−04 | 2.58869E−05 | −1.67202E−06 | 3.97910E−08 |

The following Table 16 shows values corresponding to the condition equations in Examples 1 to 5.

TABLE 16

| | Example 1 | Example 2 | Example 3 | Example 4 | Example 5 |
|---|---|---|---|---|---|
| $|L_W - L_T|/L_W$ | 0.028 | 0.025 | 0.007 | 0.000 | 0.000 |
| $f_{G2}/f_W$ | 1.939 | 1.940 | 1.973 | 1.932 | 1.993 |
| $f_{G3}/f_W$ | 3.575 | 3.674 | 3.723 | 3.583 | 3.577 |
| $f_F/f_{G2}$ | 0.597 | 0.597 | 1.023 | 0.786 | 0.464 |
| $f_R/f_{G2}$ | 1.210 | 1.209 | 1.102 | 1.238 | 1.031 |
| $r_{1F}/f_W$ | 6.954 | 6.843 | 7.003 | 6.348 | 4.978 |
| $r_{2R}/f_W$ | 3.623 | 3.631 | 3.182 | 2.771 | 2.611 |
| $d_R/f_{G2} * L_W/f_W$ | 0.256 | 0.257 | 0.260 | 0.263 | 0.255 |
| $r_{RF}/f_{G2}$ | 1.620 | 1.591 | 1.618 | 1.548 | 1.323 |
| $(|r_{RF}| - |r_{RR}|)/f_W$ | −0.514 | −0.644 | −0.288 | −1.701 | −1.220 |
| $r_{RF}/f_W$ | 3.142 | 3.086 | 3.192 | 2.992 | 2.637 |
| $(r_{RR} + r_{RF})/(r_{RR} - r_{RF})$ | 0.076 | 0.095 | 0.043 | 0.221 | 0.188 |
| $(r_{RF} + r_{NR})/(r_{RF} - r_{NR})$ | 1.549 | 1.561 | 1.586 | 1.595 | 1.666 |
| $(1 - m_{G2T})m_{G3T}$ | 1.929 | 1.927 | 1.920 | 1.940 | 1.853 |

FIGS. 2A to 2I are longitudinal aberration diagrams of a zoom lens system according to Example 1. FIGS. 4A to 4I are longitudinal aberration diagrams of a zoom lens system according to Example 2. FIGS. 6A to 6I are longitudinal aberration diagrams of a zoom lens system according to Example 3. FIGS. 8A to 8I are longitudinal aberration diagrams of a zoom lens system according to Example 4. FIGS. 10A to 10I are longitudinal aberration diagrams of a zoom lens system according to Example 5.

FIGS. 2A to 2C, 4A to 4C, 6A to 6C, 8A to 8C, and 10A to 10C show the aberration at the wide-angle limit. FIGS. 2D to 2F, 4D to 4F, 6D to 6F, 8D to 8F, and 10D to 10F show the aberration at the middle position. FIGS. 2G to 2I, 4G to 4I, 6G to 6I, 8G to 8I, and 10G to 10I show the aberration at the telephoto limit. FIGS. 2A, 2D, 2G, 4A, 4D, 4G, 6A, 6D, 6G, 8A, 8D, 8G, 10A, 10D and 10G show the spherical aberration. FIGS. 2B, 2E, 2H, 4B, 4E, 4H, 6B, 6E, 6H, 8B, 8E, 8H, 10B, 10E and 10H shows the astigmatism. FIGS. 2C, 2F, 2I, 4C, 4F, 4I, 6C, 6F, 6I, 8C, 8F, 8I, 10C, 10F and 10I show the distortion. In the spherical aberration diagrams, the vertical axis indicates the F-number. The solid line, the short dash line and the long dash line indicate the characteristics to the d-line, the F-line and the C-line, respectively. In the astigmatism diagrams, the vertical axis indicates the half view angle. The solid line and the dash line indicate the characteristics to the sagittal image plane and the meridional image plane, respectively. In the distortion diagrams, the vertical axis indicates the half view angle.

FIGS. 11A to 11F are lateral aberration diagrams of a zoom lens system according to Example 1 at a telephoto limit. FIGS. 12A to 12F are lateral aberration diagrams of a zoom lens system according to Example 2 at a telephoto limit. FIGS. 13A to 13F are lateral aberration diagrams of a zoom lens system according to Example 3 at a telephoto limit. FIGS. 14A to 14F are lateral aberration diagrams of a zoom lens system according to Example 4 at a telephoto limit. FIGS. 15A to 15F are lateral aberration diagrams of a zoom lens system according to Example 5 at a telephoto limit.

FIGS. 11A to 11C, 12A to 12C, 13A to 13C, 14A to 14C, and 15A to 15C are lateral aberration diagrams at a telephoto limit corresponding to a basic state that image blur compensation is not performed. FIGS. 11D to 11F, 12D to 12F, 13D to 13F, 14D to 14F, and 15D to 15F are lateral aberration diagrams corresponding to an image blur compensation state at a telephoto limit in which the entire second lens unit G2 is moved by a predetermined amount in a direction perpendicular to the optical axis. Among the lateral aberration diagrams of the basic state, FIGS. 11A, 12A, 13A, 14A and 15A correspond to the lateral aberration at an image point at 75% of the maximum image height. FIGS. 11B, 12B, 13B, 14B and 15B correspond to the lateral aberration at the axial image point. Further, FIGS. 11C, 12C, 13C, 14C and 15C correspond to the lateral aberration at an image point at −75% of the maximum image height. Among the lateral aberration diagrams of the image blur compensation state, FIGS. 11D, 12D, 13D, 14D and 15D correspond to the lateral aberration at an image point at 75% of the maximum image height. FIGS. 11E, 12E, 13E, 14E and 15E correspond to the lateral aberration at the axial image point. Further, FIGS. 11F, 12F, 13F, 14F and 15F correspond to the lateral aberration at an image point at −75% of the maximum image height. Here, in the lateral aberration diagrams, the meridional image plane is adopted as the plane containing the optical axis of the first lens unit G1 and the optical axis of the second lens unit G2.

Here, the amount of movement of the second lens unit G2 in a direction perpendicular to the optical axis in the image blur compensation state is 0.094 mm in Example 1, 0.094 mm in Example 2, 0.095 mm in Example 3, 0.094 mm in Example 4, and 0.098 mm in Example 5. Here, the amount of image decentering in a case that the zoom lens system inclines by 0.6 when the shooting distance is ∞ at a telephoto limit is equal to the amount of image decentering in a case that the entire second lens unit G2 moves in parallel in a direction perpendicular to the optical axis by each of the above values.

As seen from the lateral aberration diagrams, satisfactory symmetry is obtained in the lateral aberration at the axial image point. Further, when the lateral aberration at the +75% image point and the lateral aberration at the −75% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel movement required for image blur compensation decreases with decreasing focal length of the entire lens system. Thus, at arbitrary zoom positions, sufficient image blur compensation can be performed for image blur compensation angles up to 0.6° without degrading the imaging characteristics.

INDUSTRIAL APPLICABILITY

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for a shooting optical system such as a digital still camera or a digital video camera requiring high image quality.

The invention claimed is:

1. A zoom lens system, in order from an object side, comprising:
a first lens unit of negative optical power, the first lens unit, in order from the object side, consisting of a first lens element having a negative meniscus shape with a surface of strong curvature facing the image side, and a second lens element which is a positive lens element with a surface of strong curvature facing the object side;
a second lens unit of positive optical power, the second lens unit including at least one cemented lens element, the second lens unit including a most object side surface convex to the object side and a most image side surface convex to the image side; and
a third lens unit of positive optical power, the third lens unit comprising solely one positive lens element,
wherein the lens units move respectively along an optical axis so that a magnification is changed with changing a distance between the respective lens units,
wherein the first lens unit moves with locus of a convex to image side, while the second lens unit monotonically moves to object side in magnification change from a wide-angle limit to a telephoto limit, and
wherein the following condition is satisfied:

$$1.9 < f_{G2}/f_W < 2.4 \tag{2}$$

(where, $Z = f_T/f_W > 2.5$)

wherein,
$f_{G2}$ is a focal length of the second lens unit,
$f_T$ is a focal length of the entire lens system at a telephoto limit, and
$f_W$ is a focal length of the entire lens system at a wide-angle limit.

2. An imaging device capable of converting an optical image of a photographic object into an electric image signal and then outputting the signal, comprising:
a zoom lens system that forms an optical image of the photographic object with a variable magnification; and
an image sensor that converts the optical image of the photographic object formed by the zoom lens system into the electric signal, wherein
the zoom lens system is a zoom lens system as claimed in claim 1.

3. A camera capable of shooting a photographic object and then outputting it as an electric image signal, comprising:
an imaging device including a zoom lens system that forms an optical image of the photographic object with a variable magnification and an image sensor that converts the optical image of the photographic object formed by the zoom lens system into the electric signal, wherein
the zoom lens system is a zoom lens system as claimed in claim 1.

4. A zoom lens system, in order from an object side, comprising:
a first lens unit of negative optical power, the first lens unit, in order from the object side, having a first lens element having a negative meniscus shape with a surface of strong curvature facing the image side, and a second lens element which is a positive lens element with a surface of strong curvature facing the object side;
a second lens unit of positive optical power, the second lens unit including at least one cemented lens element, the second lens unit including a most object side surface convex to the object side and a most image side surface convex to the image side; and
a third lens unit of positive optical power, the third lens unit comprising solely one positive lens element,
wherein the lens units move respectively along an optical axis so that a magnification is changed with changing a distance between the respective lens units,
wherein the first lens unit moves with locus of a convex to image side, while the second lens unit monotonically moves to object side in magnification change from a wide-angle limit to a telephoto limit, and
wherein the following condition is satisfied:

$$0.4 < f_F/f_{G2} < 1.1 \tag{4}$$

wherein,
$f_{G2}$ is a focal length of the second lens unit, and
$f_F$ is a focal length of a lens element having the most object side surface convex to the object side of the second lens unit.

5. An imaging device capable of converting an optical image of a photographic object into an electric image signal and then outputting the signal, comprising:
a zoom lens system that forms an optical image of the photographic object with a variable magnification; and
an image sensor that converts the optical image of the photographic object formed by the zoom lens system into the electric signal, wherein
the zoom lens system is a zoom lens system as claimed in claim 4.

6. A camera capable of shooting a photographic object and then outputting it as an electric image signal, comprising:
an imaging device including a zoom lens system that forms an optical image of the photographic object with a variable magnification and an image sensor that converts the optical image of the photographic object formed by the zoom lens system into the electric signal, wherein
the zoom lens system is a zoom lens system as claimed in claim 4.

7. A zoom lens system, in order from an object side, comprising:
a first lens unit of negative optical power, the first lens unit, in order from the object side, having a first lens element having a negative meniscus shape with a surface of strong curvature facing the image side, and a second lens element which is a positive lens element with a surface of strong curvature facing the object side;
a second lens unit of positive optical power, the second lens unit including at least one cemented lens element, the second lens unit including a most object side surface convex to the object side and a most image side surface convex to the image side; and
a third lens unit of positive optical power, the third lens unit comprising solely one positive lens element,
wherein the lens units move respectively along an optical axis so that a magnification is changed with changing a distance between the respective lens units,
wherein the first lens unit moves with locus of a convex to image side, while the second lens unit monotonically moves to object side in magnification change from a wide-angle limit to a telephoto limit, and
wherein the following condition is satisfied:

$$2.0 < r_{2R}/f_W < 3.8 \tag{7}$$

(where, $Z = f_T/f_W > 2.5$)

wherein, $r_{2R}$ is a radius of curvature of the image side surface of the second lens element, $f_W$ is a focal length of the entire lens system at a wide-angle limit, and $f_T$ is a focal length of the entire lens system at a telephoto limit.

8. An imaging device capable of converting an optical image of a photographic object into an electric image signal and then outputting the signal, comprising:

a zoom lens system that forms an optical image of the photographic object with a variable magnification; and an image sensor that converts the optical image of the photographic object formed by the zoom lens system into the electric signal, wherein the zoom lens system is a zoom lens system as claimed in claim 7.

9. A camera capable of shooting a photographic object and then outputting it as an electric image signal, comprising:

an imaging device including a zoom lens system that forms an optical image of the photographic object with a variable magnification and an image sensor that converts the optical image of the photographic object formed by the zoom lens system into the electric signal, wherein the zoom lens system is a zoom lens system as claimed in claim 7.

* * * * *